(12) United States Patent  
Frisco et al.

(10) Patent No.: US 8,671,432 B2  
(45) Date of Patent: Mar. 11, 2014

(54) AIRCRAFT IN-FLIGHT ENTERTAINMENT SYSTEM HAVING A DUAL-BEAM ANTENNA AND ASSOCIATED METHODS

(75) Inventors: Jeffrey A. Frisco, Palm Bay, FL (US); Michael J. Lynch, Merritt Island, FL (US); Brian D. Anderson, Apopka, FL (US); Robert M. Keen, Malibar, FL (US)

(73) Assignee: Livetv, LLC, Melbourne, FL (US)

( * ) Notice: Subject to any disclaimer, the term of this patent is extended or adjusted under 35 U.S.C. 154(b) by 1547 days.

(21) Appl. No.: 12/252,272

(22) Filed: Oct. 15, 2008

(65) Prior Publication Data

US 2009/0100476 A1    Apr. 16, 2009

Related U.S. Application Data

(63) Continuation-in-part of application No. 12/047,349, filed on Mar. 13, 2008.

(60) Provisional application No. 60/980,298, filed on Oct. 16, 2007.

(51) Int. Cl.
   *H04N 7/20*    (2006.01)
(52) U.S. Cl.
   USPC ............................................. 725/72; 725/68
(58) Field of Classification Search
   USPC ............................. 725/63, 64, 68, 69, 70, 72
   See application file for complete search history.

(56) References Cited

U.S. PATENT DOCUMENTS

| | | | | |
|---|---|---|---|---|
| 6,043,788 A * | 3/2000 | Seavey | ................... | 343/781 CA |
| 6,741,841 B1 * | 5/2004 | Mitchell | ................... | 455/188.1 |
| 6,911,949 B2 * | 6/2005 | Naym et al. | .................. | 343/765 |
| 7,321,383 B2 | 1/2008 | Monagahn et al. | ........ | 348/14.02 |
| 7,379,707 B2 * | 5/2008 | DiFonzo et al. | ............. | 455/12.1 |
| 2008/0085691 A1 * | 4/2008 | Harvey et al. | ............. | 455/187.1 |

* cited by examiner

*Primary Examiner* — Chi Pham  
*Assistant Examiner* — Weibin Huang  
(74) *Attorney, Agent, or Firm* — Allen, Dyer, Doppelt, Milbrath & Gilchrist, P.A.

(57) ABSTRACT

An aircraft in-flight entertainment (IFE) system for an aircraft includes a radome to be carried by the aircraft, and a dual-beam satellite antenna and at least one positioner coupled thereto to be carried by the aircraft and protected by the radome. The dual-beam satellite antenna is to generate dual antenna beams for television programming and Internet data from respective spaced apart satellites. The dual-beam satellite antenna includes a first aperture for receiving the television programming, and a second aperture adjacent the first aperture for receiving the Internet data. A television programming distribution system is to be carried by the aircraft and coupled to the dual-beam satellite antenna to provide television programming within the aircraft. At least one access point is to be carried by the aircraft and coupled to the dual-beam satellite antenna to provide a wireless local area network (WLAN) within the aircraft for the Internet data.

28 Claims, 23 Drawing Sheets

AIRCRAFT IN-FLIGHT ENTERTAINMENT SYSTEM HAVING A DUAL-BEAM ANTENNA AND ASSOCIATED METHODS

RELATED APPLICATION

This application is a continuation-in-part of U.S. patent application Ser. No. 12/047,349 filed Mar. 13, 2008, the entire contents of which are incorporated herein by reference; and this application claims the benefit of U.S. Provisional Application Ser. No. 60/980,298 filed Oct. 16, 2007, the entire contents of which are incorporated herein by reference.

FIELD OF THE INVENTION

The present invention relates to the field of aircraft systems, and more particularly, to an aircraft in-flight entertainment (IFE) system having a dual-beam antenna for satellite communications.

BACKGROUND OF THE INVENTION

Commercial aircraft carry millions of passengers each year. For relatively long international flights, wide-body aircraft are typically used. These wide-body aircraft include multiple passenger aisles and are considerably larger and have considerably more space than typical so-called narrow-body aircraft. Narrow-body aircraft carry fewer passengers shorter distances, and include only a single aisle for passenger loading and unloading. Accordingly, the available space for ancillary equipment is somewhat limited on a narrow-body aircraft.

Wide-body aircraft may include full audio-on-demand and video-on-demand in-flight entertainment systems for passenger enjoyment during relatively long flights. Typical wide-body aircraft in-flight entertainment systems may include cabin displays, or individual seatback displays. Movies or other stored video programming is selectable by the passenger, and payment is typically made via a credit card reader at the seat. For example, U.S. Pat. No. 5,568,484 to Margis discloses a passenger in-flight entertainment system with an integrated telecommunications system. A magnetic stripe credit card reader is provided at the telephone handset and processing to approve the credit card is performed by a cabin telecommunications unit.

In addition to prerecorded video entertainment, other systems have been disclosed including a satellite receiver for live television broadcasts, such as disclosed in French Patent No. 2,652,701 and U.S. Pat. No. 5,790,175 to Sklar et al. The Sklar et al. patent also discloses such a system including an antenna and its associated steering control for receiving both RHCP and LHCP signals from direct broadcast satellite (DBS) services. The video signals for the various channels are then routed to a conventional video and audio distribution system on the aircraft which distributes live television programming to the passengers.

In addition, U.S. Pat. No. 5,801,751 also to Sklar et al. addresses the problem of an aircraft being outside of the range of satellites, by storing the programming for delayed playback, and additionally discloses two embodiments: a full system for each passenger and a single channel system for the overhead monitors for a group of passengers. The patent also discloses steering the antenna so that it is locked onto RF signals transmitted by the satellite. The antenna steering may be based upon the aircraft navigation system or a GPS receiver along with inertial reference signals.

Current aircraft in-flight entertainment systems may also provide television programming and Internet data. Such systems may include a shared satellite antenna for receiving the television programming and the Internet data, headend electronic equipment at a central location in the aircraft, a cable distribution network extending throughout the passenger cabin, and electronic demodulator and distribution modules spaced within the cabin for different groups of seats. Many systems require signal attenuators or amplifiers at predetermined distances along the cable distribution network. In addition, each passenger seat may include an armrest control and seatback display. In other words, such systems may be relatively heavy and consume valuable space on the aircraft.

Space and weight are especially difficult constraints for a narrow-body aircraft. U.S. Pat. Nos. 6,741,841 and 7,321,383 both disclose an aircraft in-flight entertainment system providing television programming and Internet data using a shared satellite antenna. The satellite antenna may be a multi-beam or dish antenna, for example. However, these patents fail to disclose the specifics of implementing a multi-beam phased array antenna operating as part of an in-flight entertainment system for simultaneously receiving television programming and Internet data.

SUMMARY OF THE INVENTION

In view of the foregoing background, an object of the present invention is to provide an aircraft in-flight entertainment (IFE) system having a dual-beam antenna for receiving television programming and Internet data.

This and other objects, advantages and features in accordance with the present invention are provided by an in-flight entertainment (IFE) system comprising a radome to be carried by the aircraft, and a dual-beam satellite antenna and at least one positioner coupled thereto to be carried by the aircraft and protected by the radome. The dual-beam satellite antenna may generate dual antenna beams for television programming and Internet data from respective spaced apart satellites. The dual-beam satellite antenna may comprise a first aperture for receiving the television programming, and a second aperture adjacent the first aperture for receiving the Internet data. A television programming distribution system may be carried by the aircraft and coupled to the dual-beam satellite antenna to provide television programming within the aircraft. At least one access point may be carried by the aircraft and coupled to the dual-beam satellite antenna to provide a wireless local area network (WLAN) within the aircraft for the Internet data. The first aperture may comprise a first phased array, and the second aperture may comprise a second phased array.

The at least one positioner may comprise a first positioner to position the first aperture toward one of the spaced apart satellites, and a second positioner to position the second aperture toward the other one of the spaced apart satellites. A controller may be coupled to the positioners.

The dual-beam satellite antenna may simultaneously generate the dual antenna beams, with each antenna beam having a respective antenna beam boresight. The dual-beam satellite antenna may also be configured to transmit to the satellite providing the Internet data.

The first and second apertures may have an antenna beam offset between their respective antenna beams. The at least one positioner may comprise a common positioner for positioning both the first and second apertures at a same time while maintaining the antenna beam offset. The IFE system may further comprise an offset controller to be carried by the aircraft and coupled to the first and second apertures for adjusting the antenna beam offset.

The first and second apertures may each have different orthogonal polarizations associated therewith. The first aperture may provide two orthogonal polarizations toward one of the satellites, and the second aperture may provide two different orthogonal polarizations toward the other satellite. The IFE system may further comprise at least one polarization correction module to adjust at least one of the polarizations based upon aircraft position. More particularly, the first aperture may provide orthogonal polarizations toward one of the satellites and the second aperture may provide different orthogonal polarizations toward the other satellite. The aircraft IFE system may further comprise a first polarization correction module associated with the first aperture for adjusting the corresponding polarizations based upon aircraft position, and a second polarization correction module associated with the second aperture for adjusting the corresponding polarizations based upon aircraft position.

The first aperture may be configured to operate within a frequency range of 12 to 16 GHz, and the second aperture may be configured to operate within a frequency range of 20 to 30 GHz. The television programming distribution system may comprise cabling extending throughout the aircraft, and at least one video display coupled to the cabling for displaying the television programming. The at least one access point may communicate with personal electronic devices (PEDs) within the aircraft. The at least one access point may comprise a pico-cell, and the WLAN may comprise at least one of an 802.11 WLAN and an 802.16 WLAN.

Another aspect is directed to a method for operating an aircraft in-flight entertainment (IFE) system for an aircraft and comprising a radome to be carried by the aircraft, a dual-beam satellite antenna to be protected by the radome, at least one positioner to be carried by the aircraft and coupled to the dual-band satellite antenna, a television programming distribution system to be carried by the aircraft and coupled to the dual-beam satellite antenna to provide television programming within the aircraft, and at least one access point to be carried by the aircraft and coupled to the dual-beam satellite antenna to provide a wireless local area network (WLAN) within the aircraft. The method comprises controlling the at least one positioner so that the dual-beam satellite antenna generates dual antenna beams for television programming and Internet data from respective spaced apart satellites. The dual-beam satellite antenna may comprise a first aperture for receiving the television programming, and a second aperture adjacent the first aperture for receiving the Internet data. The method may further comprise providing the television programming to aircraft passengers via the television programming distribution system, and providing the Internet data to the aircraft passengers via the WLAN.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
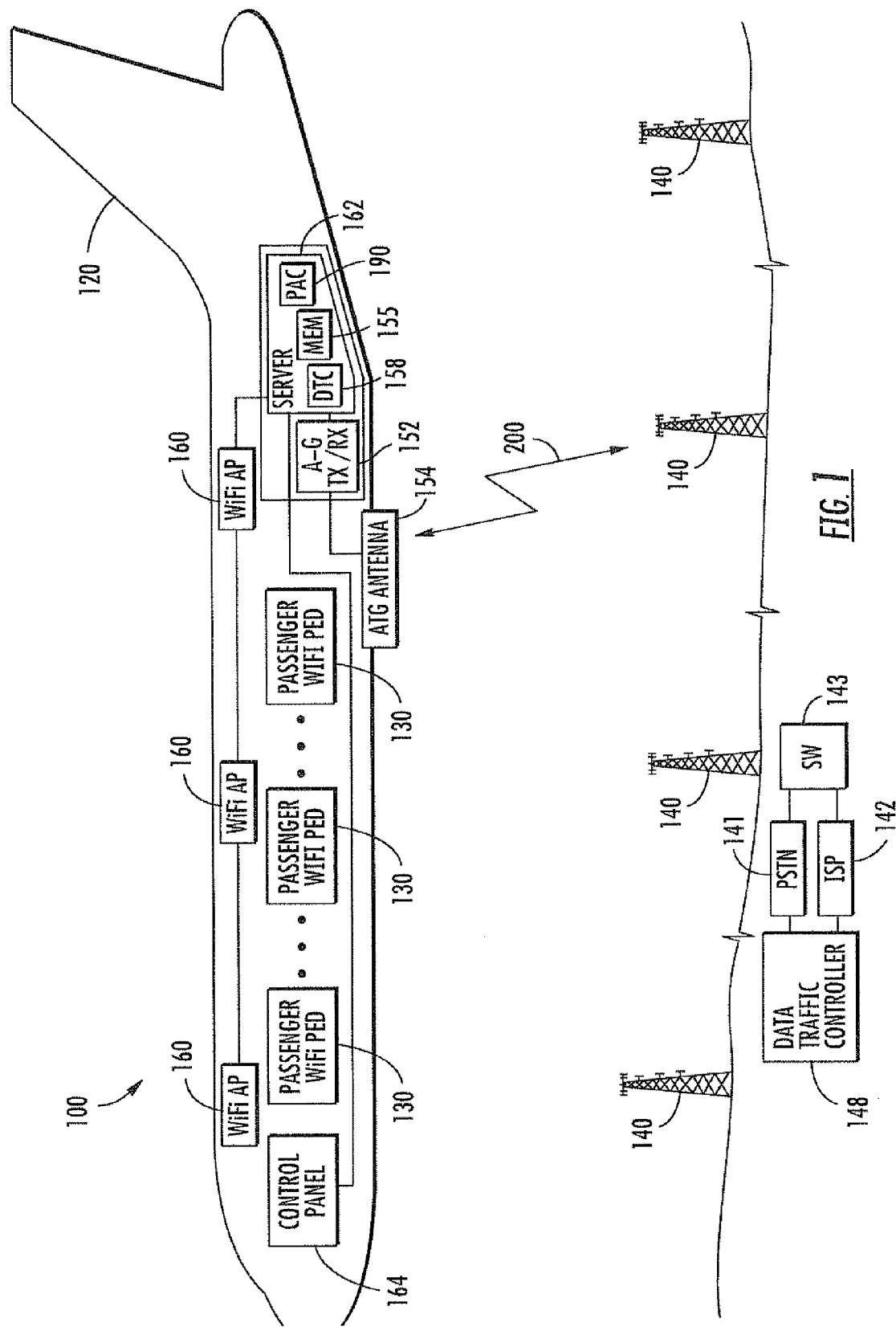
FIG. 1 is a schematic diagram of an air-to-ground communications network in accordance with the present invention.

Referring initially to FIG. 1, an air-to-ground communications network 100 will be discussed in which passengers within an aircraft 120 are able to communicate over an air-to-ground interface 200 using their own personal electronic devices (PEDs) 130. PEDs 130 include personal mobile smart phones or telephones (cellular and PCS), personal digital assistants, wireless email devices, wireless equipped laptop computers having Wi-Fi/WiMax capability, air cards, or WiFi equipped MP3 players, for example.

As will be discussed in greater detail below, the air-to-ground communications network 100 may be considered as a data-based network as compared to a terrestrial voice-based network that also supports data. A data-based network supports emails and text messaging without having to specifically take into account the additional requirements (including latency) associated with traditional two-way, full duplex live conversational voice. However, the air-to-ground communications network 100 supports voice capability, as VoIP, and can send multimedia in the form of streaming video, multimedia web surfing, still pictures, music, etc. As a result, hard handoffs may be used between the ground-based base stations 140 as the aircraft 120 is in flight. Soft handoffs are often used for voice-based networks, which negatively impacts the amount of frequency spectrum needed for a handoff.

The air-to-ground network 100 is not constrained to use air interfaces deployed for terrestrial networks. An air interface that is not used for terrestrial networks may be used. The air-to-ground interface 200 is used to communicate with the ground-based base stations 140. Each base station 140 illustratively interfaces with the public switched telephone network (PSTN) 141 and an Internet service provider (ISP) 142 through a switch 143 for providing email and text messaging services. The PSTN 141 and the ISP 142 are illustrated for only one of the base stations 40. Alternatively, an Internet connection 42 could only be provided and not a PSTN connection 41.

In the United States, for example, there are approximately 100 base-stations 140 positioned to directly support the air-to-ground communications network 100 disclosed herein. This is particularly advantageous since the frequency band of the air-to-ground interface 200 is different than the frequency bands associated with cellular mobile telecommunication systems. In the illustrated example of the air-to-ground communications network 100, the allocated frequency spectrum of the air-to-ground interface 200 is based on a paired spacing of 851 MHz and 896 MHz, with 0.5 MHz available at each frequency.

In contrast, one portion of the radio spectrum currently used for terrestrial wireless communications companies is in the 824-849 MHz and 869-894 MHz bands. PCS is a wireless communications network that operates at a radio frequency of 1.9 GHz. Internationally, other frequencies and bands have been allocated for licensed wireless communications, but they do not operate using the paired spacing of 851 MHz and 896 MHz.

In the illustrated embodiment, equipment has been installed on the aircraft 120 so that the aircraft appears as a hotspot or intranet to the PEDs 130. Nodes or access points 160 are spaced throughout the cabin area of the aircraft 120 providing 802.11 services (i.e., Wi-Fi) or 802.16 services (i.e., WiMax), for example. In addition, access to the network 100 could be through an on-board pico-cell in which the PEDs 130 communicate therewith using cellular or PCS functions. A pico-cell is analogous to a Wi-Fi or WiMax access point 160.

The access points 160 are illustratively connected to an on-board server 162 and an air-to-ground transceiver 152. The server 162 includes a data memory cache 155 and a data traffic controller 158. An air-to-ground antenna 154 is coupled to the air-to-ground transceiver 152. An optional control panel 164 is illustratively coupled to the server 162. The data memory cache 155 is for storing common data accessible by the PEDs 130 during flight of the aircraft 120, as well as caching web pages for web browsing by a PED 130. The data memory cache 155 also stores information during hard handoffs between base stations 140 as part of a store-and-forward capability. In addition to the cache memory 155 scheme, the server 162 includes a memory supporting a pass-through scheme, as readily appreciated by those skilled in the art.

The aircraft-based data traffic controller 158 is for selectively allocating data communications channel capacity between the PEDs 130 and the ground-based base stations 140. Selectively allocating data communications channel capacity may also be alternatively or additionally performed on the ground using a ground-based data traffic controller 148 coupled to the PSTN 141 and the ISP 142. The respective controllers 148, 158 control the IP traffic that will be allowed over the air-to-ground network 200.

The respective controllers 148, 158 thus operate as filters, which may be static or dynamic. Their operation depends on whether the network 100 is lightly loaded or heavily loaded. For example, an email (from the aircraft 120) with a very large attachment would be limited or restricted by the aircraft-based data traffic controller 158, whereas an Internet request resulting in a large number of web pages being sent to a PED 130 (from a ground-based base station 140) would be limited by the ground-based data traffic controller 148.

By selectively allocating the data communications channel capacity, a greater or maximum number of passengers on the aircraft 120 can communicate over the air-to-ground interface 200 using their own PEDs 130. For a given PED 130, the aircraft-based data traffic controller 158 may thus limit data communications from exceeding a predetermined portion of the data communications channel capacity.

Allocation of the data communications channel capacity may be based on a number of different factors or metrics. For example, the respective data traffic controllers 148, 158 may allocate the data communications channel capacity based on a priority of service. For example, credit card information used for on-board purchases/shopping could have a higher priority over e-mail. The data communications may comprise flight operational data and non-flight operational data. Certain types of traffic may have priority over other types of traffic. Personnel having PEDs 130 include passengers, as well as other individuals supporting operation of the aircraft. Personnel with PEDs 130 supporting operation of the aircraft would be associated with flight operational data, and this may be assigned a higher priority.

PEDs 130 that are cellular or PCS devices and are also Wi-Fi compatible are known as dual-mode devices. One of the modes is cellular communications, with the other mode being Wi-Fi communications. Many laptop, personal computers, and PDAs are Wi-Fi/WiMax compatible, which are also classified herein as PEDs. After a connection is made to the on-board server 162 via Wi-Fi or WiMax, each PED 130 can transmit and receive emails and text messages over the air-to-ground interface 200.

The dual-mode PEDs 130 carried by the passengers thus support multiple air interfaces, i.e., a terrestrial network and Wi-Fi or WiMax. Example terrestrial networks include any one of the following: 1) PCS, 2) the GSM family including EDGE, GPRS, HSDPA, HSUPA, and 3) the CDMA family including IS-95, CDMA2000, 1xRTT, EVDO. The terrestrial network may also operate based on other network interfaces standards, as will be readily appreciated by those skilled in the art. To reduce the cost of the dual-mode PEDs 130, a software radio may be used wherein the radio is configured to the air interface standard that is available. If more than one air interface standard is available, different metrics may be evaluated to determine a preferred air interface.

Figure 2:
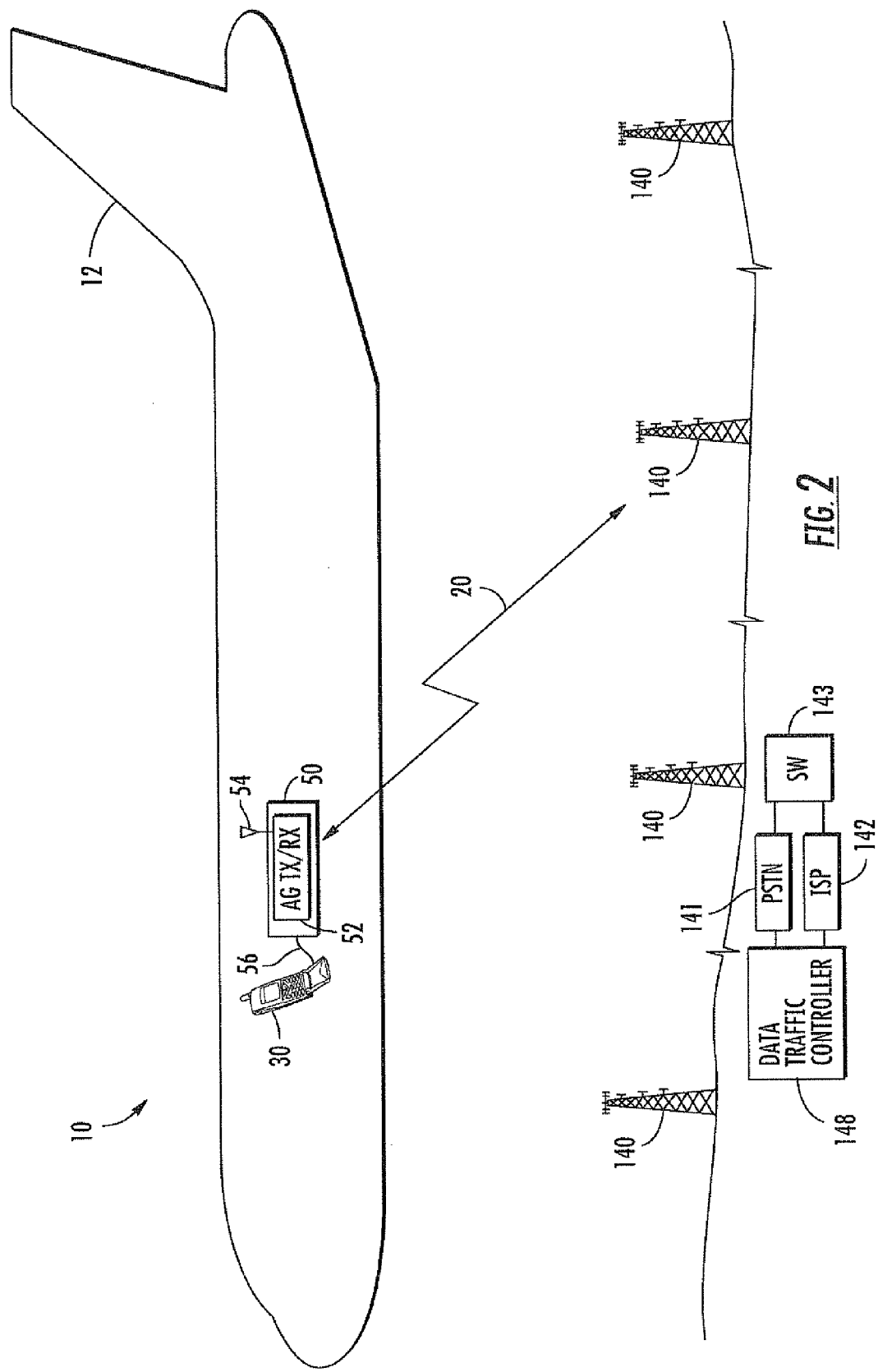
FIG. 2 is a schematic diagram of another embodiment of the air-to-ground communications network with passenger carried equipment on the aircraft in accordance with the present invention.
Figure 3:
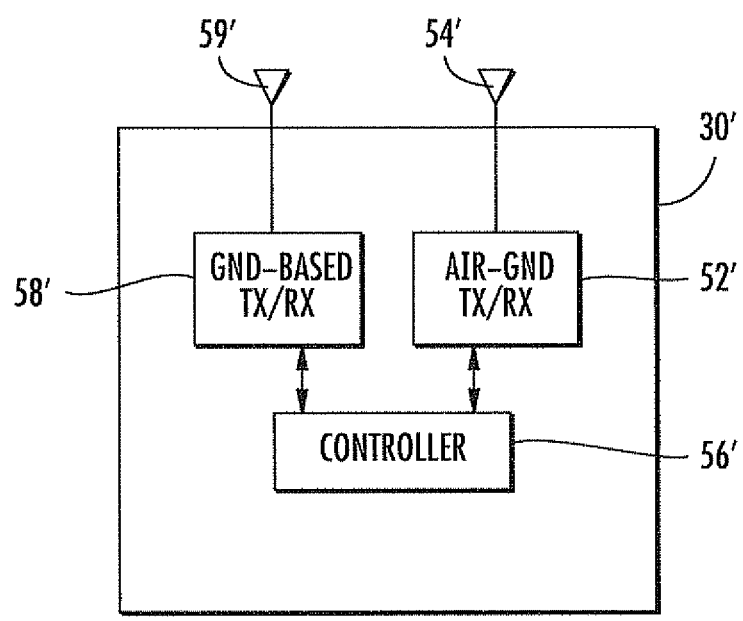
FIG. 3 is a schematic diagram of another embodiment of the PED shown in FIG. 2 with the translator device integrated therein.

Referring now to FIGS. 2 and 3, as an alternative to aircraft installed equipment, a respective translator device 50 may be used to interface between each PED 30 and a ground-based base station 40 over the air-to-ground interface 20. The translator device 50 comprises an air-to-ground transceiver 52 with an air-to-ground antenna 54 coupled thereto.

In the illustrated embodiment, no additional equipment may need to be installed in the aircraft 12 since the translator devices 50 would be brought on-board by the passengers. Each translator device 50 may interface with the PED 30 via a wired or wireless connection. The wireless connection may be a Wi-Fi connection (802.11) or a WiMax connection (802.16), for example. The wired connection may be a USB interface 55.

Alternatively, the translator device may be integrated directly into the PED 30', as illustrated in FIG. 3. The PED 30' would further include a controller 56' for selecting between the ground-based transceiver 58' or the air-to-ground transceiver 52' associated with the translator. A separate antenna 59' is coupled to the ground-based transceiver 58'. Instead of separate antennas 54' and 59', a shared antenna may be used. The controller 56' may perform the selection automatically based on one or more monitored metrics, or the selection may be based on input from the user.

Referring again to FIG. 1, another aspect of the illustrated embodiment is directed to a method for operating a communications system 100 for an aircraft 120 carrying at least some personnel having PEDs 130 for wireless data communications outside the aircraft with a ground-based communications network. The communications system 100 includes an access point 160 in the aircraft 120 for providing a WLAN for data communications with the PEDs 130, and an air-to-ground transceiver 152 in the aircraft 120 cooperating with the access point 160 for data communications with the ground-based communications network. The method may comprise selectively allocating data communications channel capacity between the PEDs 130 and the ground-based communications network using at least one data traffic controller. The at least one data traffic controller may be an aircraft-based data traffic controller 158 and/or a ground-based data traffic controller 148.

Figure 4:
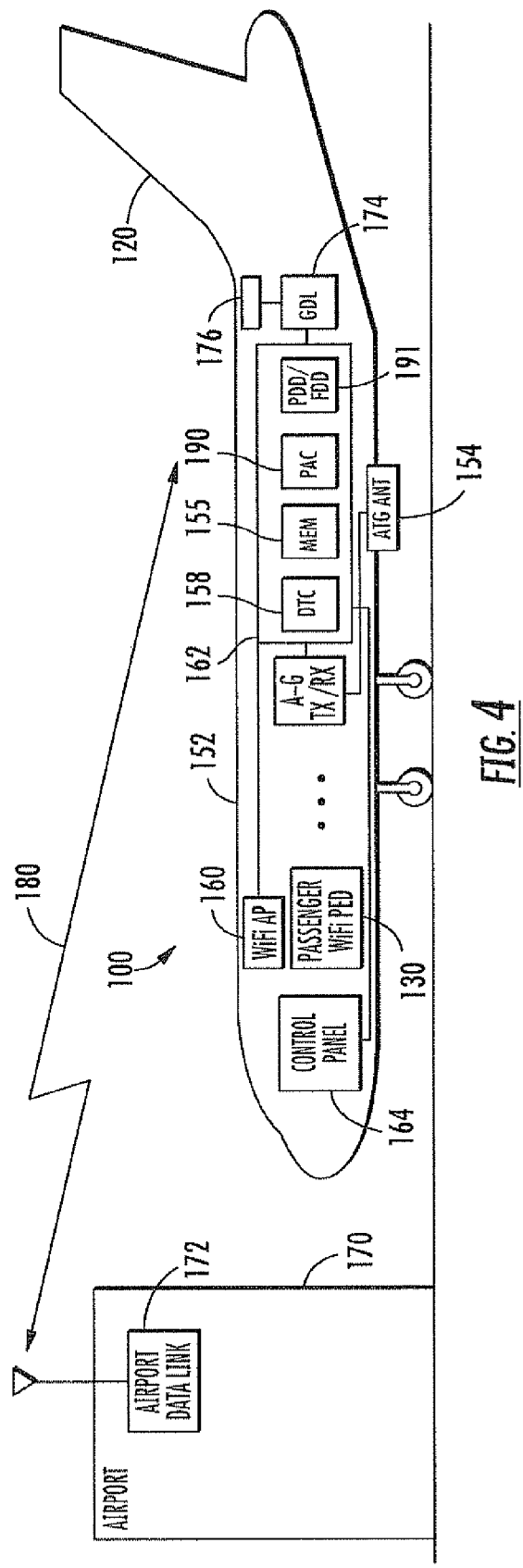
FIG. 4 is a schematic diagram of the air-to-ground communications network in which predetermined web pages are transmitted over an airport data link for storage on the aircraft in accordance with the present invention.

Referring now to FIG. 4, another aspect will be discussed with respect to the data memory cache 155 cooperating with the access point 160 for storing common data accessible by the PEDs 130 during flight of the aircraft 120. The common data may be in the form of web pages in which passengers can browse via their PED 130.

One of the functions of the data memory cache 155 is for caching predetermined web pages to be browsed. Instead of the aircraft 120 receiving the web pages while in-flight, the web pages are received while the aircraft is on the ground. Nonetheless, the web pages may be alternatively or additionally updated or refreshed while in flight. As an alternative to the data memory cache 155, streaming video or audio could be real time or stored as provided from a satellite, including via a preexisting satellite based IFE system on the aircraft 120.

The stored web pages may be directed to a particular topic or theme, such as services and products. The services may also be directed to advertisements, for example. A purchase acceptance controller 190 cooperates with the WLAN to accept a purchase from the PEDs 130 responsive to the common data related to the services and products.

For example, the web content may be directed to an electronic retail supplier so that any one of the passengers on-board the aircraft 120 can shop for a variety of different items using their PED 130. Once a passenger selects an item for purchase, the transaction can be completed in real time while being airborne via the purchase acceptance controller 190 communicating over the air-to-ground link 200. This form of on-board shopping may also be referred to as air-commerce. Alternatively, the transaction could be initiated on-board the aircraft 120 via the purchase acceptance controller 190 but the actual purchase could be forwarded via the ground data link 174 once the aircraft 120 is on the ground.

The data memory cache 155 may be configured to push the common data related to the services and products to the PEDs 130. Also, the data memory cache 155 may permit the PEDs 130 to pull the common data related to the services and products therefrom.

Figure 5:
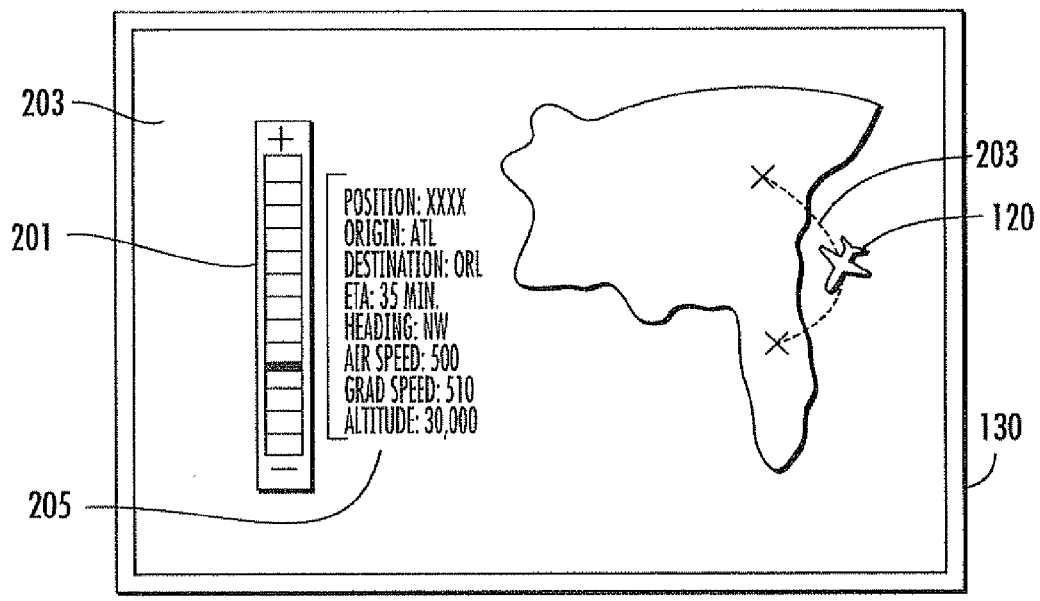
FIG. 5 is a screen shot from a PED of an interactive map corresponding to the flight path of the aircraft in accordance with the present invention.
Figure 6:
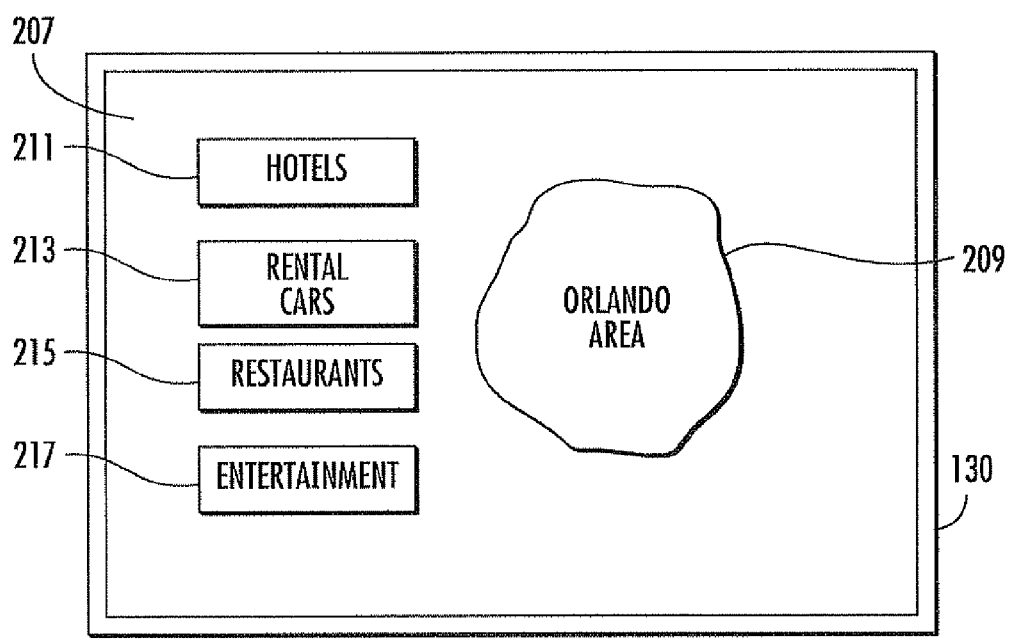
FIG. 6 is a screen shot from a PED of an interactive map corresponding to the destination of the aircraft in which different information categories are displayed in accordance with the present invention.

In addition to products and services, the common data is directed to interactive maps, as will now be discussed in reference to FIGS. 5 and 6. When an interactive map is displayed on a PED 130, the passenger is able to scroll or zoom in and out using a scroll or zoom bar 201, as illustrated by the screen shot 203 from their PED 130. The interactive maps preferably correspond to the flight path 203 of the aircraft 120, and are updated or refreshed via the ground data link 174 when the aircraft 120 is parked on the ground at the airport 170.

While in flight, the current location of the aircraft 120 can be displayed. Flight information 205 may also be displayed. The current location of the aircraft 120 may be provided by a position determining device/flight path determining 191, such as a GPS system carried by the aircraft. Alternatively, the position of the aircraft 120 can be determined on the ground and passed to the aircraft over the air-to-ground link 200. The final destination of the aircraft 120 can also be displayed prior to arrival at the destination. In addition, destination information such as the arriving gate number, connecting gate numbers, baggage claim information, hotels, rental car agencies, restaurants, etc. could also be displayed.

Data associated with the destination 209 may also be made available to the passengers. As illustrated by the screen shot 207 from a PED 130, data categories titled Hotels 211, Rental Cars 213, Restaurants 215 and Entertainment 217 are available for viewing by the passenger.

If the passenger does not already have a hotel reservation, then a desired or preferred hotel associated with the destination of the aircraft 120 can be selected from the Hotels category 211. The communications system 100 advantageously allows the passenger to make a hotel reservation while in flight. Likewise, a rental car reservation can also be made while in flight if a car is needed. Other points of interest or services (such as restaurants and entertainment) associated with the destination of the aircraft 120 can also be made available to the passengers, including reservations, coupons and other available discounts, for example.

Referring back to FIG. 4, when the aircraft 120 is parked on the ground at the airport 170, a wireless airport data link 172 is used to transmit the web content pages to the data memory cache 155 via a ground data link receiver 174 carried by the aircraft 120. A ground data link antenna 176 is coupled to the ground data link receiver 174. The ground data link interface 180 may be compatible with 802.11 or 802.16, for example. The ground data link interface 180 may be Wi-Fi or WiMax for the aircraft 120. Other interface standards may be used as will be readily appreciated by those skilled in the art. These interfaces also include cellular and PCS compatibility, for example.

When the aircraft 120 lands at a different airport, the web pages can be updated or refreshed over the ground data link interface 180. In addition, email and text messaging by the PEDs 130 may be continued after the aircraft is on the ground. Since the air-to-ground interface 200 may not be available when the aircraft 120 is on the ground, the ground data link interface 180 would then be used.

Once the web pages are stored in the data memory cache 155, a passenger using their Wi-Fi or WiMax enabled PED 130 can access and browse the web pages for on-board shopping while the aircraft 120 is airborne. The data memory cache 155 is sufficiently sized for storing a large amount of information, as will be readily appreciated by those skilled in the art.

The on-board shopping just described is for items that are not carried on the aircraft 120. On-board shopping may also be provided to the passengers for a limited number of products. For example, when watching a movie or listening to music, passengers have the option of receiving standard headphones or they can purchase a different set of headphones, such as high quality noise suppression headphones. These transactions can also be completed via the passenger's PED 130 using the web-based pages stored in the data memory cache 155.

Another aspect of the illustrated embodiment is directed to a method for operating a communications system 100 for an aircraft 120 carrying at least some personnel having personal electronic devices (PEDs) for wireless data communications outside the aircraft with a ground-based communications network. The communications system 100 may include an access point 160 in the aircraft 120 for providing a wireless local area network (WLAN) for data communications with the PEDs 130, and an air-to-ground transceiver 152 in the aircraft 120 cooperating with the access point 160 for data communications with the ground-based communications network. The method may comprise storing common data accessible by the PEDs 130 during flight of the aircraft 120 using an aircraft data memory cache 155 in the aircraft and cooperating with the access point 160.

Figure 7:
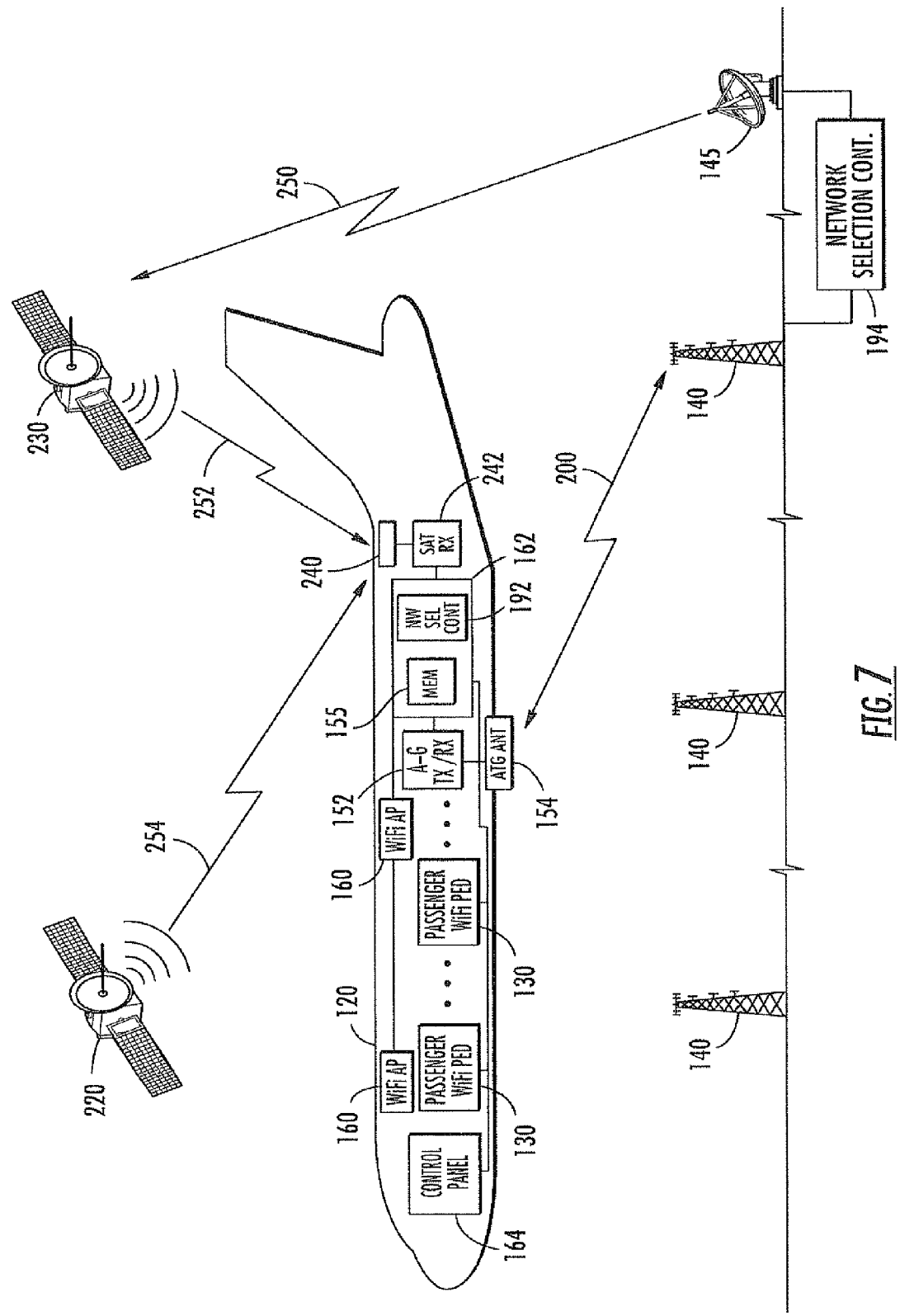
FIG. 7 is a schematic diagram of the air-to-ground communications network in which network selection controllers are used for selecting between satellite or air-to-ground communications in accordance with the present invention.

The PEDs 130 are not limited to receiving and transmitting information over the air-to-ground interface 200. Referring now to FIG. 7, signals may be transmitted from satellites 220, 230 to a multi-beam satellite antenna 240 coupled to a satellite receiver 242 carried by the aircraft 120. This is in addition to transmitting and receiving signals over the air-to-ground interface 200 via the ground-based network and the air-to-ground transceiver 152 carried by the aircraft 120.

In the illustrated embodiment, an aircraft-based network selection controller 192 is associated with the air-to-ground transceiver 152 and the access points 160. The aircraft-based network selection controller 192 determines whether data communications should be sent to the PEDs 130 through the air-to-ground transceiver 152 or the satellite receiver 242. This is accomplished by appending data to return via a satellite.

In addition or in lieu of the aircraft-based network selection controller 192, a ground-based network selection controller 194 is coupled between a ground-based satellite transmitter 145 and the ground-based base stations 140. The ground-based network selection controller 194 also determines whether to send data communications to the PEDs 130 through the air-to-ground transceiver 152 or through the satellite receiver 242.

Satellite 220 provides television and digital radio signals for an in-flight entertainment (IFE) system on the aircraft 120 over satellite link 254. Even though only one satellite is represented, the television and digital radio signals may be provided by separate satellites, such as a DirectTV™ satellite and an XM™ radio satellite. In addition, a third satellite may be used to provide email and text messaging, multimedia messaging, credit card transactions, web surfing, etc. The illustrated satellite antenna 240 supports communications with all three satellites, i.e., the DirectTV™ satellite, the XM™ radio satellite, and the email-text messaging satellite.

An example IFE system is disclosed in U.S. Pat. No. 7,748, 597. This patent is assigned to the current assignee of the present invention, and is incorporated herein by reference in its entirety. The television and digital radio signals are sent through the on-board server 162 to seat electronic boxes (SEBs) spaced throughout the aircraft for selective viewing on video display units (VDUs). Passenger control units (PCUs) are used to control the VDUs. The digital radio signals are also distributed to the SEBs for reception via passenger headphones.

Of particular interest is that additional information can be obtained from the satellite 220 which can then be made available to the PEDs 130. For example, the satellite 220 may provide information including sports scores, stock ticker, news headlines, destination weather and destination traffic. The satellite signals received by the satellite receiver 242 are provided to the on-board server 162 for repackaging this particular information for presentation to the PEDs 130 via the access points 160, as will be readily appreciated by those skilled in the art.

When available, satellites with or without leased transponders may also provide additional information to be repackaged by the on-board server 162. The other satellite 230 may be a fixed satellite service (FSS) for providing Internet access to the PEDs 130, for example. For example, satellite television and satellite radio signals may be provided to the passengers on their PEDs 130 via Wi-Fi.

In this configuration, a message for web pages requested by the passenger (via their PED 130) is provided over the air-to-ground interface 200. The message on the ground would then be routed to an appropriate ground-based network selection controller 194, which would then transmit the request to the FSS satellite 230. The satellite link between the appropriate ground-based transmitter 145 and the satellite 230 is represented by reference 250. The FSS satellite 230 then transmits the requested web pages to the aircraft 120 over satellite link 252 upon receiving the request from the ground.

Since the satellites may be somewhat close together in a geospatial arc, transmitting the return link over the air-to-ground link 200 instead of over the satellite links 252, 254 avoids causing interference from the aircraft 120 to neighboring satellites. Nonetheless, the request could be transmitted directly from the aircraft 120 to the satellite 230 using a steerable or directional satellite antenna.

The request provided by the PED 130 is often referred to as the return link. The information from the satellites 220, 230 to the aircraft 120 is often referred to as the forward link. The air-to-ground interface 200 is a narrow band interface, which is acceptable for making a request since such a request is typically narrower band than the forward link. In contrast, satellite links 252 and 254 are wide band interfaces, which are ideal form providing the requested web pages that are typically wide band data.

Each of the network selection controllers 192, 194 may be used to determine whether to send data communications to the PEDs 130 through the air-to-ground transceiver 152 or the satellite receiver 242 based on a needed channel capacity of the data communications to be sent or congestion on a link. Data communications with a higher needed channel capacity is typically sent with a high bandwidth using the satellite receiver 242, and data communications with a lower needed channel capacity is typically sent with a low bandwidth using the air-to-ground transceiver 152. Alternatively, the high and low broadband data communications links may be reversed. Alternatively, the network controllers could determine that the aircraft 120 is out of the coverage area for the air-to-ground network or the air-to-ground network is at capacity in the location for that aircraft. In this case, the network selection controllers could route the traffic over the satellite network. Alternatively, the network selection controllers could route some traffic types over one network and other traffic types over the other network, as readily appreciated by those skilled in the art.

One of the network selection controllers 192, 194 may determine to send data communications to the PEDs 130 through the air-to-ground transceiver 152 or through the satellite receiver 242 based on received signal strength of the data communications, or a position of the aircraft. The current location of the aircraft 120 may be provided by a position determining device/flight path determining 191, such as a GPS system carried by the aircraft. Alternatively, the position of the aircraft 120 can be determined on the ground and passed to the aircraft over the air-to-ground link 200. If the aircraft 120 is to fly over the ocean, then data should be received through the satellite receiver 242. By monitoring signal strength of the received signals or the position of the aircraft, a determination can be made on when the ground-based base stations 140 are no longer available, and communications should be received via the satellite receiver 242.

The network selection controllers 192, 194 thus determine whether to send static and dynamic web pages through the satellite-based communications network 145, 230 to the PEDs 130. Dynamic web pages include streaming video, for example. Each network selection controller 192, 194 may determine to send requests for at least one of the static and dynamic web pages from the PEDs 130 through the access points 160 and the air-to-ground transceiver 152.

As noted above, predetermined web pages are stored in the data memory cache 155 when the aircraft 120 is parked on the ground (i.e., electronic retailer shopping and on-board shopping, as well as advertisements). Since the satellite links 252, 254 are wide band, the requested web information may also be downloaded for storage or refreshed in the data memory cache 155 while the aircraft is in flight.

Another aspect of the illustrated embodiment is directed to a method for operating a communications system 100 for an aircraft 120 carrying at least some personnel having personal electronic devices (PEDs) 130 for wireless data communications outside the aircraft. The communications system 100 includes a ground-based communications network, a satellite-based communications network, and at least one access point 160 in the aircraft 120 for providing a WLAN for data communications with the PEDs 130. An air-to-ground transceiver 154 in the aircraft 120 may cooperate with the at least one access point 160 for data communications with the ground-based communications network, and a satellite receiver 242 in the aircraft may cooperate with the at least one access point for data communications with the satellite-based communications network to the PEDs. The method includes determining whether to send data communications to the PEDs 130 through the air-to-ground transceiver 152 or the satellite receiver 242.

Figure 8:
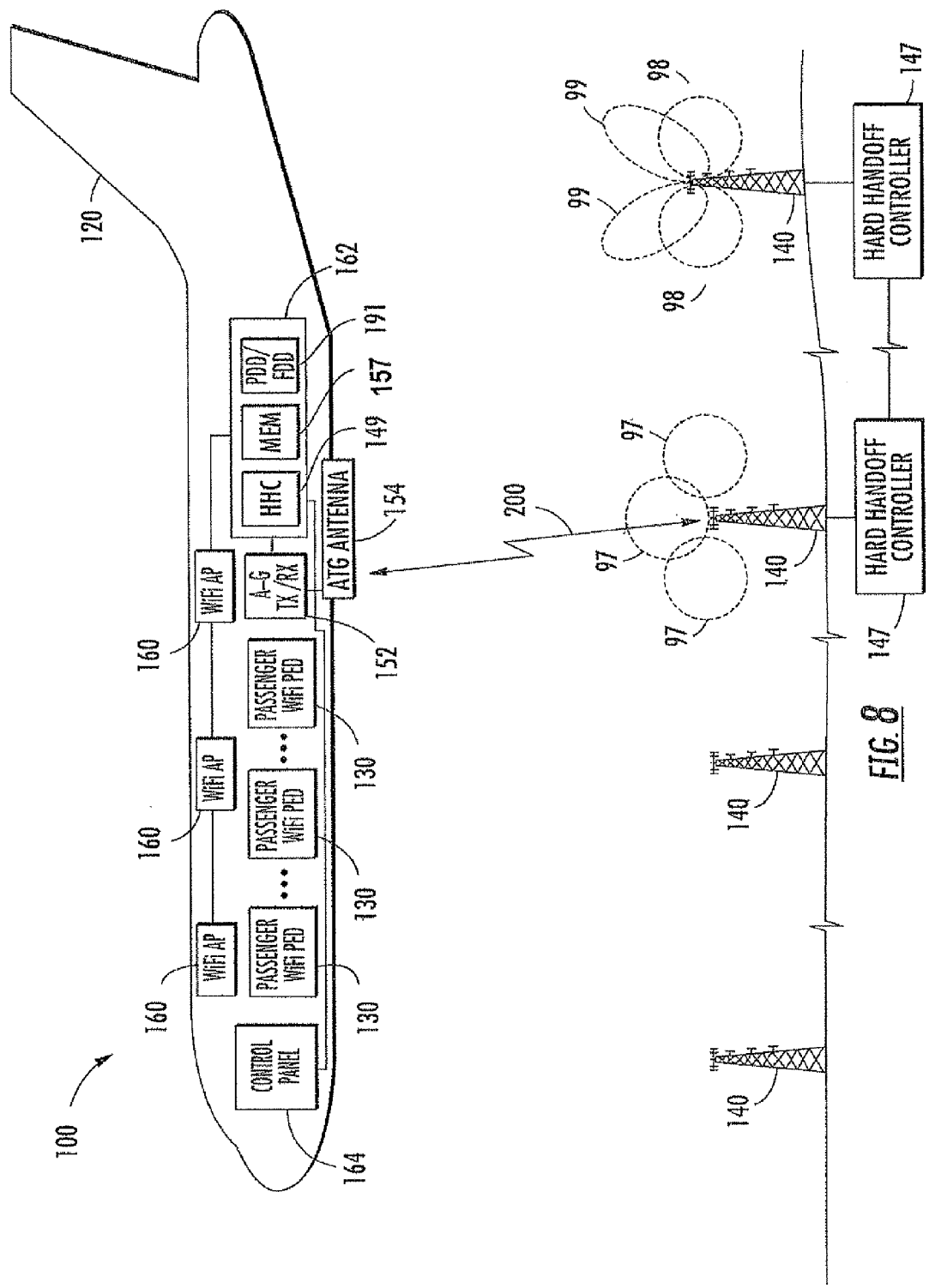
FIG. 8 is a schematic diagram of the air-to-ground communications network in which hard handoff controllers are used for handing off the aircraft between base stations in accordance with the present invention.

Referring now to FIG. 8, another aspect is directed to handoff of the aircraft 120 from one ground-based base station 140 to an adjacent ground-based base station, or between azimuth or elevation sectors on one base station. Since the air-to-ground network 100 may be optimized for data instead of voice, delays or latencies can be tolerated without the end user having the perception that the call is being dropped as is the case with voice. Consequently, soft handoffs are needed for voice-based networks.

In contrast, data can be stored on the ground or on the aircraft while the aircraft 120 is between cell coverage areas for a hard handoff. Once the aircraft 120 is within coverage of the next cell, the data can then be forwarded.

Hard handoffs can thus be used to make the connection from one base station 140 to an adjacent base station in support of the air-to-ground communications network 100. Messages being communicated between a PED 130 and the ground can be stored in a buffer or memory 157. The buffer 157 may be part of the data memory cache 155, or alternatively, the buffer may be a separate memory as illustrated. Each base station 140 has a hard handoff controller 147 associated therewith. Moreover, with the aircraft 120 typically flying at speeds over 500 mph, the delay is relatively short.

To support a soft handoff, as would be necessary with voice, twice the spectrum resources would be needed. With a hard handoff, the spectrum is preserved at the expense of having sufficient memory for storing data in the buffer 157 (or on the ground) during a handoff while the aircraft 120 is between base stations 140.

The base stations 140 define respective adjacent coverage areas and comprise respective hard handoff controllers 147 for implementing a hard handoff of a data communications channel with the air-to-ground transceiver 152 as the aircraft 120 moves from one coverage area to an adjacent coverage area.

An aircraft hard handoff controller 149 may cooperate with the hard handoff controllers 147 on the ground. The aircraft hard handoff controller 149 cooperates with ground-based hard handoff controllers 147 by monitoring metrics. The metrics include a received signal strength of the data communications channel, or available capacity at the base station 140, for example.

In another embodiment for implementing an aircraft hard handoff, the aircraft hard handoff controller 149 implements the hard handoff of a data communications channel with the air-to-ground transceiver 152 as the aircraft 120 moves from one coverage area to an adjacent coverage area. This implementation may be based on metrics collected in the aircraft. These metrics include a Doppler shift of the data communications channel, a signal-to-noise ratio of the data communications channel, or a received signal strength of the data communications channel. This implementation may also be based on position of the aircraft 120, as readily appreciated by those skilled in the art.

The buffer 157 may be separate from the aircraft hard handoff controller 149 or may be integrated as part of the hard handoff controller. The first and second hard handoff controllers 147 may implement the hard handoff based on the following metrics: a Doppler shift of the data communications channel, a signal-to-noise ratio of the data communications channel, or a received signal strength of the data communications channel, as will be readily appreciated by those skilled in the art.

In other embodiments, a position/flight determining device 191 on the aircraft 120 cooperates with the ground-based hard handoff controllers 147 for implementing the hard handoff based upon a position of the aircraft. The position/flight path determining device 191 may be a GPS or other navigational device.

The base stations 140 may be configured with selectable antenna beams for performing the hard handoff, as will now be discussed. In one embodiment, one or more of the base stations 140 include selectable antenna beams 97, with each antenna beam having a same pattern and gain but in a different sector as compared to the other antenna beams. The different sector may also be defined in azimuth and/or elevation. Each antenna beam 97 may be optimized in terms of gain and beam width. The minimally overlapping antenna beams 97 thus provide complete coverage in the different sectors.

In another embodiment, one or more of the base stations 140 include selectable antenna beams 98 and 99, with at least two antenna beams being in a same sector but with a different pattern and gain. Antenna beam 99 is high gain with a narrow beam width for communicating with the aircraft 120 at an extended distance from the base station 140. When the aircraft 120 is closer in range to the base station 140, antenna beam 98 is selected, which is low gain with a wide beam width.

As noted above, there are a number of different metrics to monitor to determine when airborne users (i.e., PEDs 130) within an aircraft 120 are to be handed off to a next base station 140. In terms of Doppler, the Doppler shift on the MAC addresses of the signals received by each base station 140 are examined. The Doppler metric is to be factored into the handoff algorithm at each base station 140.

When using GPS coordinates, each base station 140 receives GPS coordinates of the aircraft 120, and based upon movement of the aircraft, the base stations coordinate handoff of the aircraft accordingly from base station to base station.

Along the same lines, sectorized antennas at the base station 140 may be used for communicating with the aircraft 120. The antennas at each base station 140 may provide a high gain/narrow beamwidth coverage sector and a low gain/broad beamwidth coverage sector. The high gain/narrow beamwidth coverage sector may be used when link conditions with the aircraft 120 are poor. Sites could be sectorized in azimuth, elevation or both. These sectors could be static or dynamic.

If the link conditions with the aircraft 120 are good, then the low gain/broad beamwidth coverage beam is used. In one embodiment, the coverage sectors are selected based upon the link conditions with the aircraft 120. Alternatively, the coverage sectors are fixed at the base station 140. For example, the high gain/narrow beamwidth coverage sector may be used for aircraft 120 that are farther away from the base station 140, whereas the low gain/broad beamwidth coverage sector may be used for aircraft flying near the base station.

Lastly, a ground selection algorithm may be used to select a ground-based base station 140 based on the flight path and the base stations in proximity to the flight path. If the aircraft 120 is about to exit a cell, transmitted email and text messages for a PED 130 are stored until the aircraft is in the next coverage area. This advantageously allows a longer continuous connection, which makes use of the limited spectrum resources more efficiently. The ground selection algorithm could use ground-based location information or GPS data on the location of the aircraft 120 and known ground site locations to optimize connection times. The resulting system may thus be considered a store-and-forward architecture.

Another aspect of the illustrated embodiment is directed to a method for operating a communications system 100 for an aircraft 120 carrying at least some personnel having personal electronic devices (PEDs) 130 for wireless data communications outside the aircraft with a ground-based communications network. The communications system 100 includes a plurality of spaced apart base stations 140, and at least one access point 160 in the aircraft 120 for providing a wireless local area network (WLAN) for data communications with the PEDs 130. An air-to-ground transceiver 152 in the aircraft 120 may cooperate with the at least one access point 160 for data communications with the ground-based communications network. The method may include operating first and second base stations 140 to define respective first and second adjacent coverage areas, with the first and second base stations comprising respective first and second hard handoff controllers 147. The respective first and second hard handoff controllers 147 are operated for implementing a hard handoff of a data communications channel with the air-to-ground transceiver 152 as the aircraft 120 moves from the first coverage area to the second adjacent coverage area. Alternatively, the handoff decision can be implemented by an aircraft hard handoff controller 149 in the aircraft 120. This implementation may be based on metrics collected in the aircraft 120.

Figure 9:
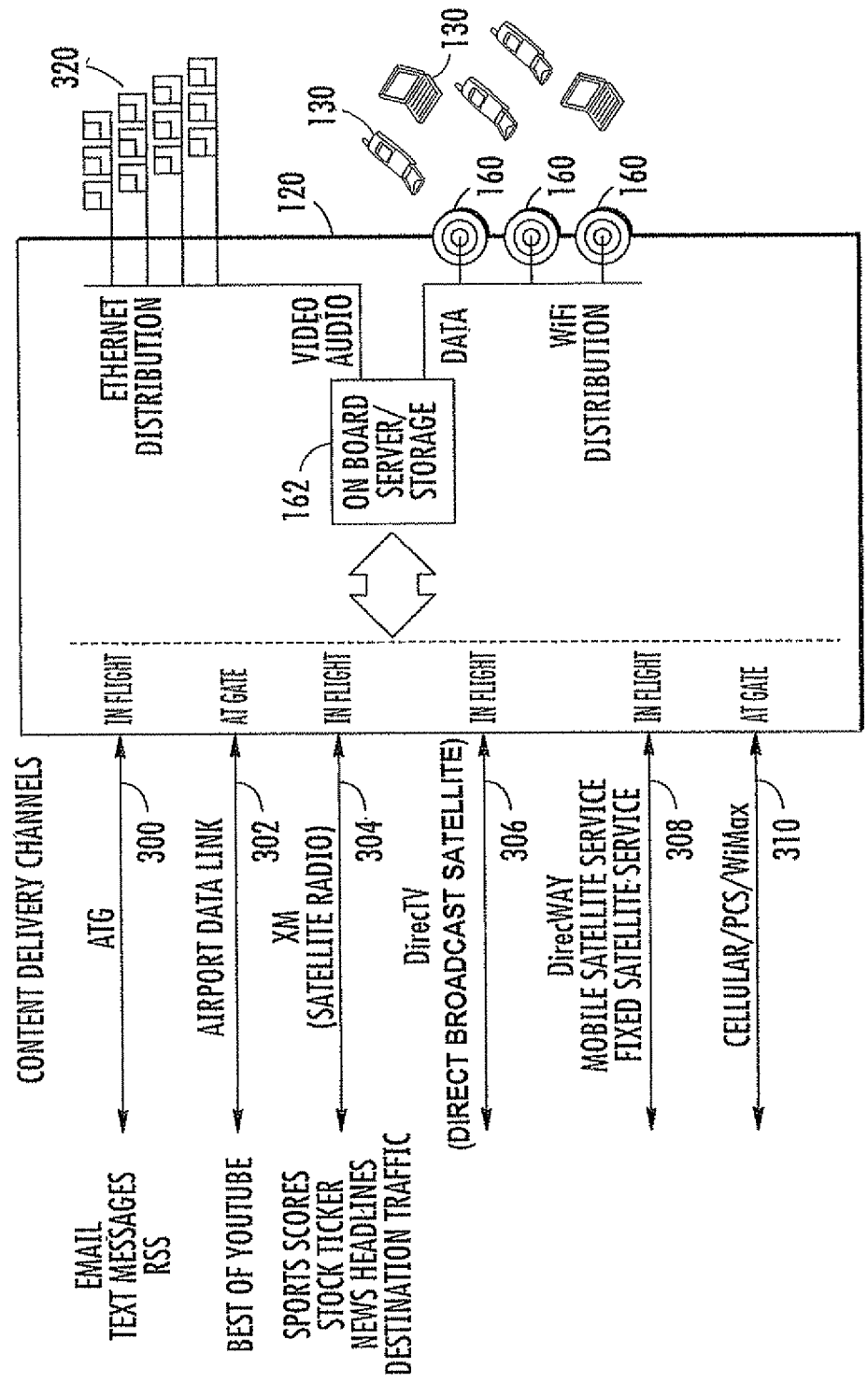
FIG. 9 is a schematic diagram of the different content delivery channels available for distribution to the aircraft passengers in accordance with the present invention.

To summarize example on-board content deliveries to the aircraft 120 from the various sources, reference is directed to FIG. 9. When in flight, the air-to-ground interface 200 provides connectivity for features that include email, text messaging, credit card transactions, multimedia messaging, web surfing and RSS as indicated by reference 300. To use RSS, the PED 130 has an RSS news reader or aggregator that allows the collection and display of RSS feeds. RSS news readers allow a passenger to view the service selected in one place and, by automatically retrieving updates, stay current with new content soon after it is published. There are many readers available and most are free.

The airport data link 172 may be used to provide the best of YouTube™ as indicated by reference 302. The XM™ satellite 220 may provide sports scores, stock ticker, news headlines and destination traffic as indicated by reference 304. DirectTV™ may also be provided by satellite 220 which can be used to provide additional information as indicated by reference 306. For future growth, two-way communications may be provided by a satellite as indicated by reference 308, such as with DirecWay or Hughesnet, for example. The airport data link 172 may also be used to provide cellular/PCS/WiMax services as indicated by reference 310.

The above content is provided to the on-board server 162 which may include or interface with the data memory cache 155. The data is provided to passenger PEDs 130 using Wi-Fi or WiMax distribution via the access points 160. Video and data is provided to an Ethernet distribution 320 for distributing throughout the aircraft as part of the in-flight entertainment system.

Figure 10:
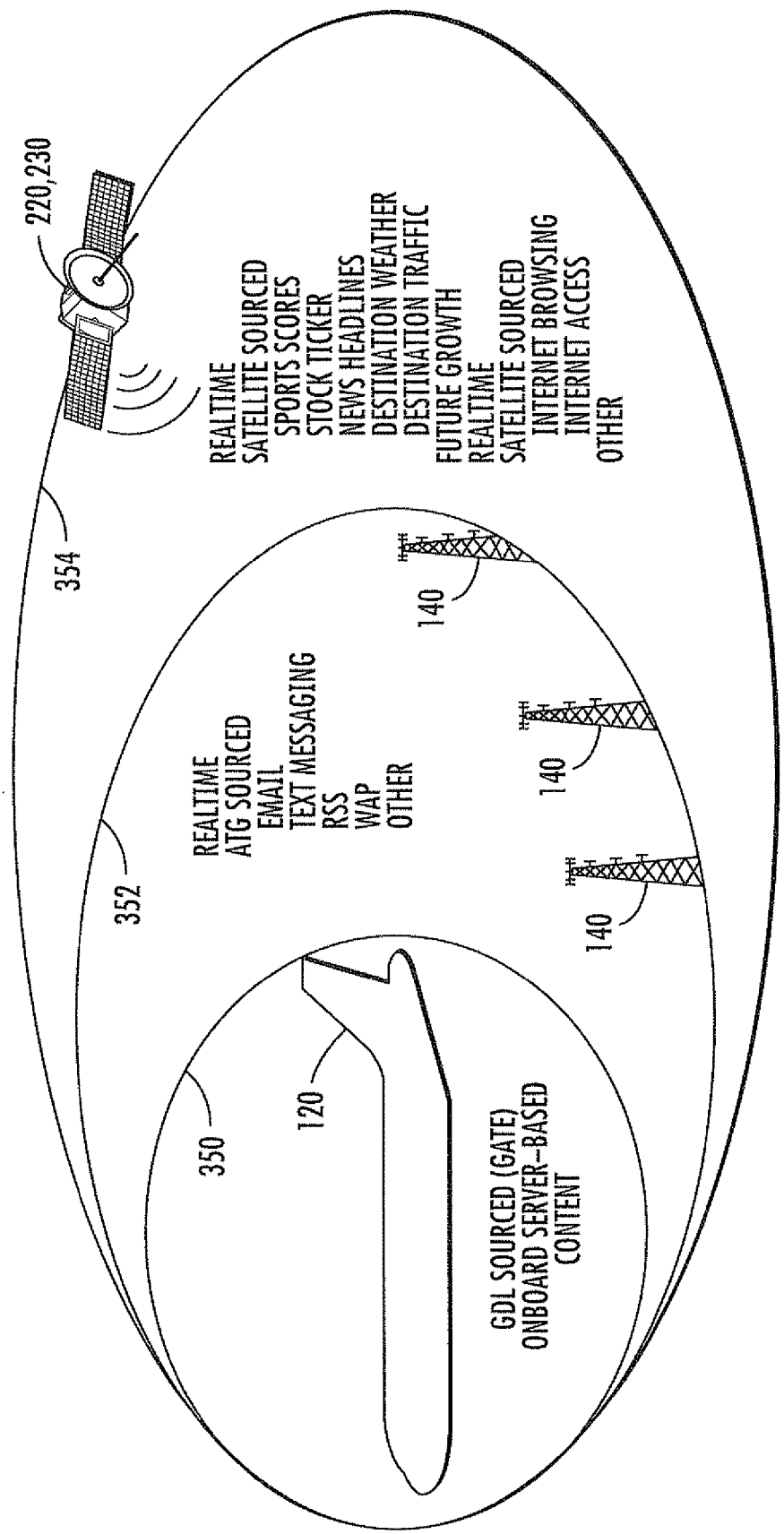
FIG. 10 is a schematic diagram of the aircraft illustrating the different ranges in which data communications is received in accordance with the present invention.

In terms of transmission distance or proximity to the aircraft 120 for the above-described on-board content deliveries, reference is directed to FIG. 10. Circle 350 represents information provided by the airport ground data link 172 when the aircraft 120 is parked at the airport 170 or moving about the airport with weight on wheels. When airborne, circle 352 represents information provided via the air-to-ground interface 200, and circle 354 represents the information provided by the satellites 220, 230. The information as discussed above is summarized in the respective circles 350, 352 and 354.

In view of the different air interface standards associated with the aircraft 120, the on-board server 162 may be configured to recognize the available air interface standards. As a result, the on-board server 162 selects the appropriate air interface standard based on proximity to a particular network. This decision may also be based on the bandwidth that is available, location of the aircraft 120 as determined by GPS, and whether the aircraft is taking off or landing. For example, when the aircraft 120 is on the ground, the ground data link interface 180 is selected. When airborne, the network selection controllers 192, 194 select either the air-to-ground interface 200 or a satellite interface 252, 254 depending on traffic demands, or both, for example.

Depending on the airline rules and regulations, the cellular mode of a dual mode cellular/Wi-Fi device may not be operated on an aircraft below a certain altitude, such as 10,000 feet. To support this requirement, the on-board server 162 and the Wi-Fi access points 160 may have enough pico-cell capability to drive the cellular radio in dual mode devices to minimum power or even to turn the cellular radios off. The connection to the wireless onboard network could be WiFi or WiMax. The pico-cell function would be to drive cellular/PCS output power to a reduced/minimum or off condition. This turns the cellular/PCS transmitter "off" while on the aircraft, while allowing Wi-Fi transmission and reception.

Another metric to monitor on the aircraft 120 is related to priority of service. This is due to the fact that that aircraft 120 can receive information over a wide band link from a satellite, for example, and transmit requests for the information over a narrow band link. If someone tries to send a large attachment on their email over the narrow band link, or they are video/audio streaming, then access will be denied or throttled or charged for a premium service for large data transfers by the data traffic controllers 158, 148. It could also be possible to use pico-cells to connect cellular/PCS mobile phones (PED) 130 to the onboard systems.

Therefore, traffic is monitored in terms of metrics to make quality of service and priority of service decisions. This decision may be made on-board the aircraft 120 for any traffic leaving the aircraft 120. This decision may also be made on the ground, which monitors if someone on the ground is sending to large of an attachment, and if so, then access will also be denied or throttled or charged for a premium service for large data transfers. These criteria for decisions could by dynamic or static.

Priority of service also relates to quality of service. Various metrics and traffic conditions can be monitored to provide connectivity to a greater or maximum number of airline passengers on a flight. Operations and cabin passenger entertainment (email, text messaging, web browsing, etc.) data can be multiplexed on a variable latency link. Operational and passenger data may also be multiplexed with multiple priorities of service allowing some data to be handled at a higher priority than other data.

Yet another aspect of the aircraft air-to-ground communications network 10 is with respect to advertisements. The advertisements are used to generate revenue from the air to ground, hybrid air to ground/satellite, or satellite communications network. For example, when a passenger opens up their laptop computer 130 on the aircraft 120, a decision is made whether or not to use the 802.11 Wi-Fi or 802.16 WiMax network. If the decision is yes, then an advertisement is displayed while accessing the network.

In addition, when portal pages are viewed, advertisements will also be displayed. Since the advertisements are used to generate revenues, passengers are allowed access to the air-to-ground communications network 100 without having to pay with a credit card or touchless payment method, as was the case for the Connexion by Boeing$^{SM}$ system. While looking at different web pages, the passengers will see advertisements interspersed or sharing the same screen.

Another function of the aircraft 120 is to use the air-to-ground communications network 100 for telemetry. Telemetry involves collecting data at remote locations, and then transmitting the data to a central station. The problem arises when the data collection devices at the remote locations are separated beyond line-of-sight from the central station. Consequently, one or more towers are required to complete the telemetry link. To avoid the costly expense of providing telemetry towers, the aircraft 120 may be used to relay the collected information from the remote locations to the central station when flying overhead.

Yet another function of the aircraft 120 is to use the air-to-ground communications network 100 for ground-based RFID tracking. Similar to using the aircraft 120 for telemetry, the aircraft may also be used for tracking mobile assets on the ground, such as a fleet of trucks, for example. The trucks transmit RFID signals that are received by the aircraft 120 as it flies overhead. The information is then relayed to a central station. The RFID signals may be GPS coordinates, for example.

Another aspect of the air-to-ground communications network 100 is to provide video on demand on the aircraft 120. This feature has been partially discussed above and involves providing television signals on demand to passengers on the aircraft. The television signals may be terrestrial based or relayed via a satellite. In particular, the return to make the request is not the same as the forward link providing the video. The return link is a low data rate link, and may be provided by the aircraft passenger's PED 130 over the air-to-ground interface 200. The forward link is a high data rate link received by a terrestrial or satellite based receiver on the aircraft. The video is then routed through the aircraft in-flight entertainment system to the passenger, or to the passenger's PED 130 via Wi-Fi. Alternatively, the video or audio can be stored in the server 162 and displayed when requested by a passenger.

Figure 11:
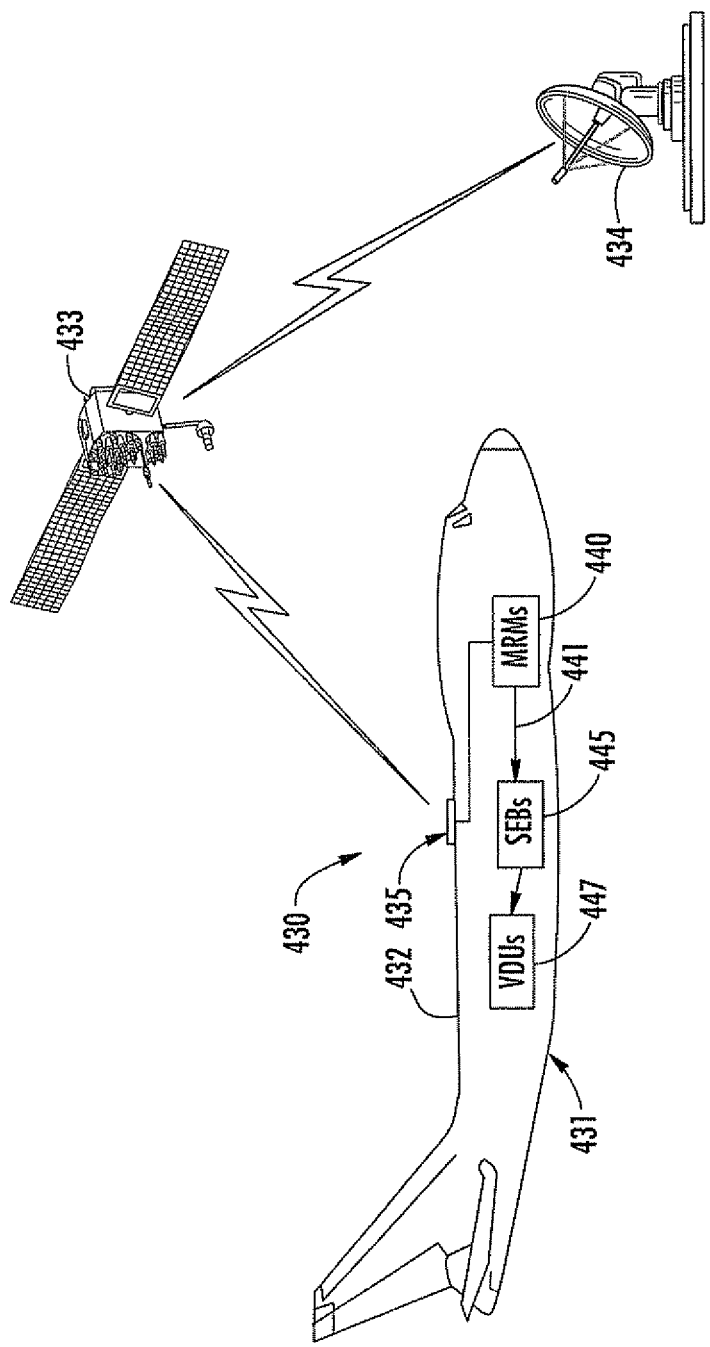
FIG. 11 is a schematic diagram of an aircraft in-flight entertainment system operating with a satellite antenna in accordance with the present invention.

The major components of an in-flight entertainment system 430 will now be discussed with reference to FIGS. 11 through 13. In particular, the illustrated system 430 is discussed with respect to a television programming distribution system. For discussion purposes, the illustrated system 430 does not include the access points 160 as discussed above.

The in-flight entertainment system 430 includes a satellite antenna system 435 to be mounted on the fuselage 432 of the aircraft 431. The satellite antenna system 435 supports reception of television programming and Internet data from separate satellites, as will be discussed in greater below. However, for discussion purposes, reception will be focused on receiving the television programming from the illustrated DBS satellite 433.

The system 430 includes one or more multi-channel receiver modulators (MRMs) 440, a cable distribution network 441, a plurality of seat electronic boxes (SEBs) 445 spaced about the aircraft cabin, and video display units (VDUs) 447 for the passengers and which are connected to the SEBs. In the illustrated embodiment, the system 430 receives, distributes, and decodes the DBS transmissions from the DBS satellite 433. In other embodiments, the system 430 may receive video or TV signals from other classes of satellites as will be readily appreciated by those skilled in the art, including Internet Data from an FSS satellite.

The satellite antenna system 435 delivers DBS signals to the MRMs 440 for processing. For example, each MRM 440 may include twelve DBS receivers and twelve video/audio RF modulators. The twelve receivers recover the digitally encoded multiplexed data for twelve television programs as will be appreciated by those skilled in the art.

Figure 12A:
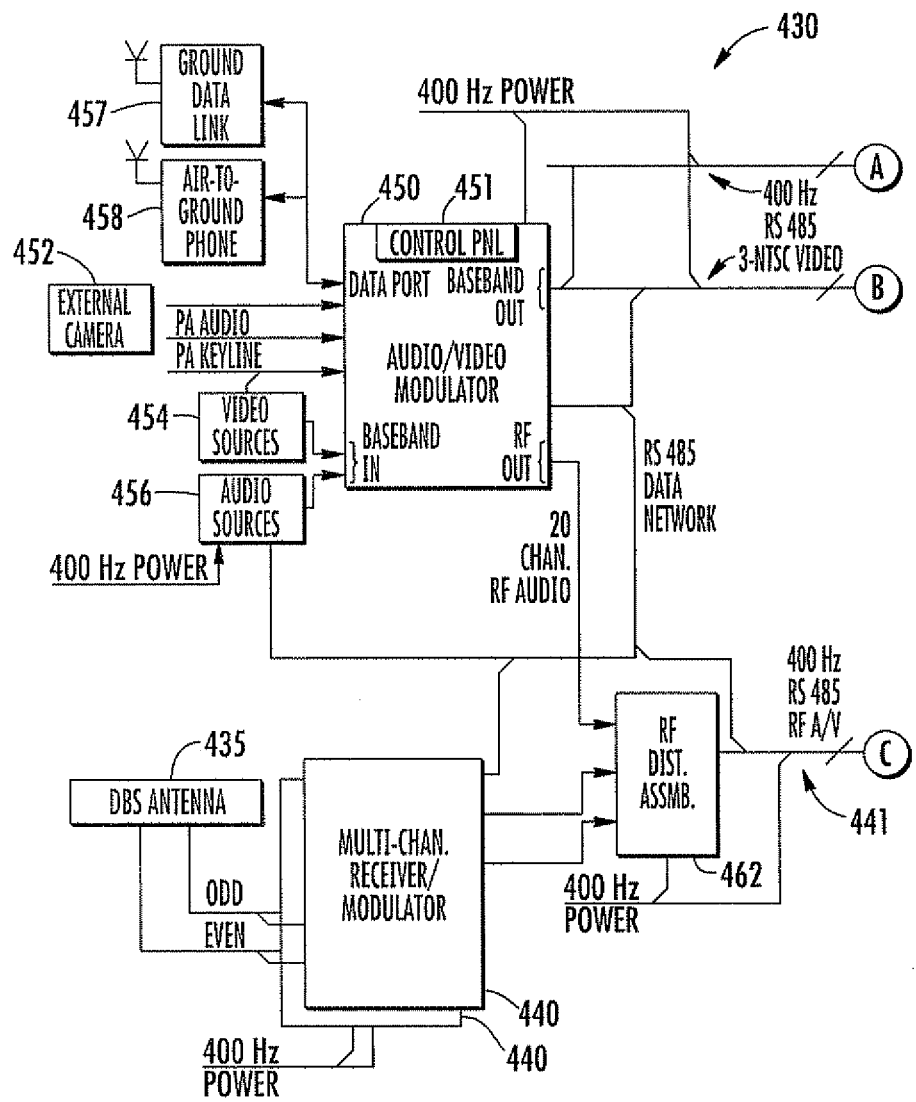
FIGS. 12A and 12B are more detailed schematic block diagrams of an embodiment of the in-flight entertainment system as shown in FIG. 11.
Figure 12B:
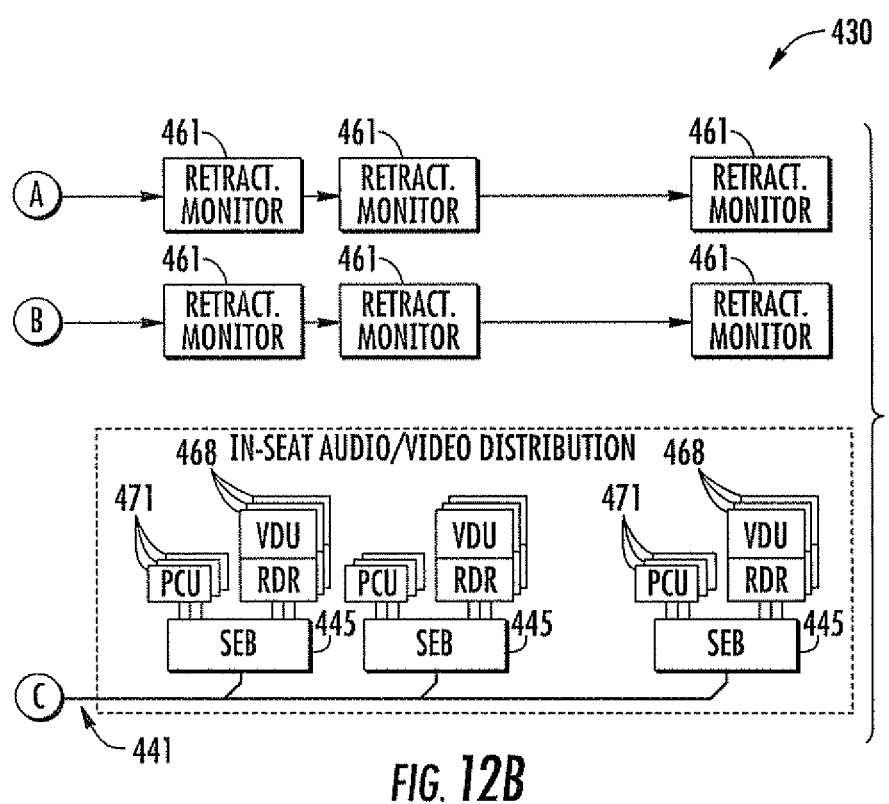

As shown in the more detailed schematic diagram of FIGS. 12A and 12B, an audio video modulator (AVM) 450 is connected to the MRMs 440, as well as a number of other inputs and outputs. The AVM 450 illustratively receives inputs from an external camera 452, as well as one or more other video sources 454, such as videotape sources, and receives signal inputs from one or more audio sources 456 which may also be prerecorded, for example. A PA keyline input and PA audio input are provided for passenger address and video address override. Audio for any receiver along with an associated keyline are provided as outputs from the MRM 440 so that the audio may be broadcast over the cabin speaker system, for example, as will also be appreciated by those skilled in the art. In the illustrated embodiment, a control panel 451 is provided as part of the AVM 450. The control panel 451 not only permits control of the system, but also displays pertinent system information and permits various diagnostic or maintenance activities to be quickly and easily performed.

The AVM 450 is also illustratively coupled to a ground data link radio transceiver 457, such as for permitting downloading or uploading of data or programming information. The AVM 450 is also illustratively interfaced to an air-to-ground telephone system 458 as will be appreciated by those skilled in the art.

The AVM 450 illustratively generates a number of NTSC video outputs which may be fed to one or more retractable monitors 461 spaced throughout the cabin. Power is preferably provided by the aircraft 400 Hz AC power supply as will also be appreciated by those skilled in the art. Of course, in some embodiments, the retractable monitors may not be needed.

The MRMs 440 may perform system control, and status monitoring. An RF distribution assembly (RDA) 462 can be provided to combine signals from a number of MRMs, such as four, for example. The RDA 462 combines the MRM RF outputs to create a single RF signal comprising up to 48 audio/video channels, for example. The RDA 462 amplifies and distributes the composite RF signal to a predetermined number of zone cable outputs. Eight zones are typical for a typical narrow-body single-aisle aircraft 431. Depending on the aircraft, not all eight outputs may be used. Each cable will serve a zone of seatgroups 465 in the passenger cabin.

Figure 13:
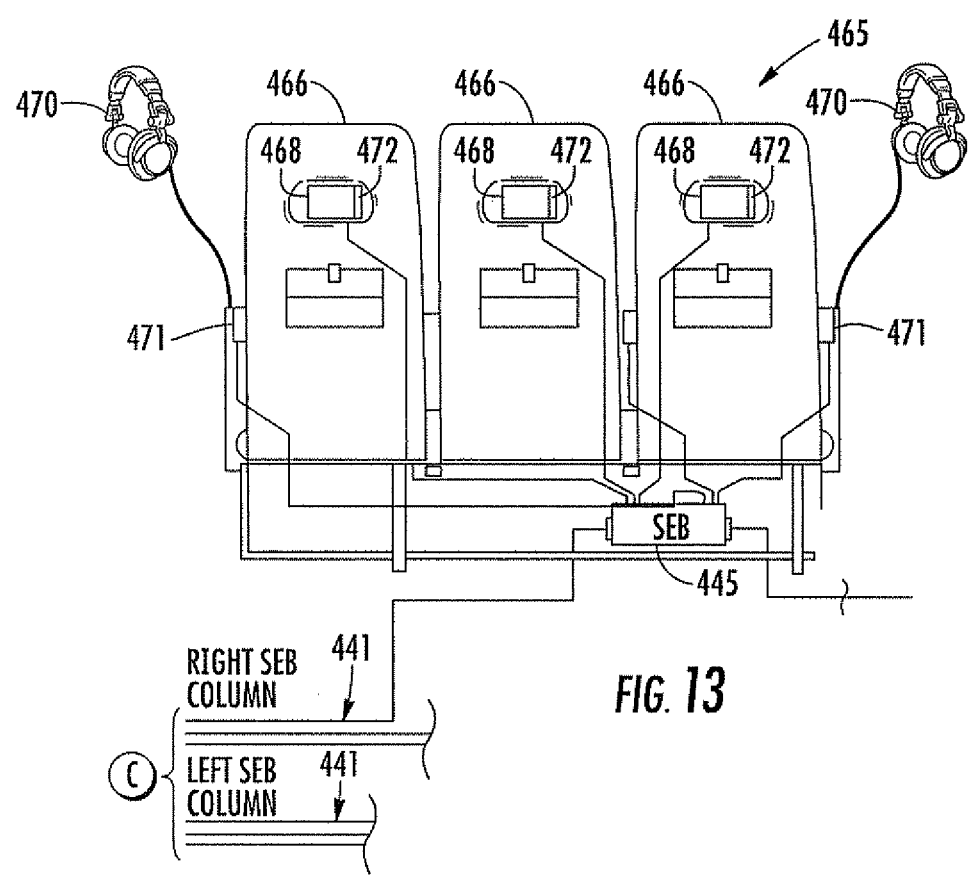
FIG. 13 is a schematic rear view of a seatgroup supporting the in-flight entertainment system as shown in FIG. 11.

Referring now more specifically to the lower portion of FIG. 12B and also to FIG. 13, distribution of the RF signals and display of video to the passengers is now further described. Each zone cable 441 feeds the RF signal to a group of contiguous seatgroups 465 along either the right or left hand side of the passenger aisle. In the illustrated embodiment, the seatgroup 465 includes three side-by-side seats 466, although this number may also be two for other types of conventional narrow-body aircraft.

The distribution cables 441 are connected to the first SEB 445 in each respective right or left zone. The other SEBs 445 are daisy-chained together with seat-to-seat cables. The zone feed, and seat-to-seat cables preferably comprise an RF audio-video coaxial cable, a 400 Hz cycle power cable, and ES 485 data wiring.

For each seat 466 in the group 465, the SEB 445 tunes to and demodulates one of the RF modulated audio/video channels. The audio and video are output to the passenger video display units (VDUs) 468 and headphones 470, respectively. The tuner channels are under control of the passenger control unit (PCU) 471, typically mounted in the armrest of the seat 466, and which also carries a volume control.

Each VDU 468 may be a flat panel color display mounted in the seatback. The VDU 468 may also be mounted in the aircraft bulkhead in other configurations as will be appreciated by those skilled in the art. The VDU 468 will also typically include associated therewith a user payment card reader 472. The payment card reader 472 may be a credit card reader, for example, of the type that reads magnetically encoded information from a stripe carried by the card as the user swipes the card through a slot in the reader as will be appreciated by those skilled in the art. In some embodiments, the credit card data may be processed on the aircraft to make certain processing decisions relating to validity, such as whether the card is expired, for example. As described in greater detail below, the payment card reader 472 may also be used as the single input required to activate the system for enhanced user convenience.

The cable distribution system is modeled after a conventional ground based cable TV system in terms of signal modulation, cabling, drops, etc. Certain changes are made to allocate the available channels, such as forty-eight, so as not to cause potential interference problems with other equipment aboard the aircraft 431 as will be appreciated by those skilled in the art. In addition, there are basically no active components along the cable distribution path that may fail, for example. The cable distribution system also includes zones of seatgroups 466. The zones provide greater robustness in the event of a failure. The zones can also be added, such as to provide full service throughout the cabin.

At least one entertainment source is installed on the aircraft. The entertainment source may include a satellite TV source, such as provided by the DES antenna system 435 and MRMs 440 described above. A plurality of spaced apart signal distribution devices is installed, each generating audio signals for at least one passenger in an audio-only mode, and generating audio and video signals to at least one passenger in an audio/video mode. These devices may be the SEBs 445 described above as will be readily appreciated by those skilled in the art.

The cable network is installed on the aircraft 431 connecting the at least one entertainment source to the signal distribution devices. In other words, the MRMs 440 are connected to the SEBs 445 in the various equipped zones throughout the aircraft 431.

Figure 14:
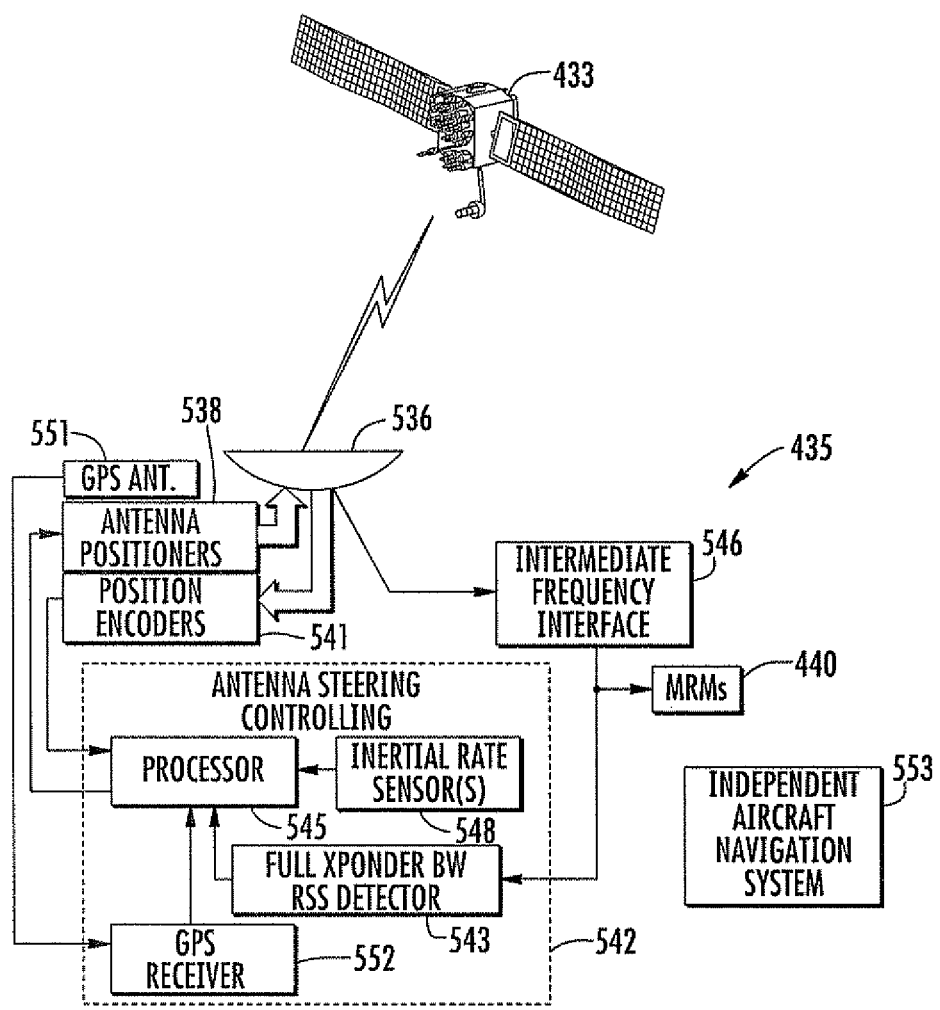
FIG. 14 is a more detailed schematic block diagram of a first embodiment of an antenna-related portion of the in-flight entertainment system as shown in FIG. 11.
Figure 15:
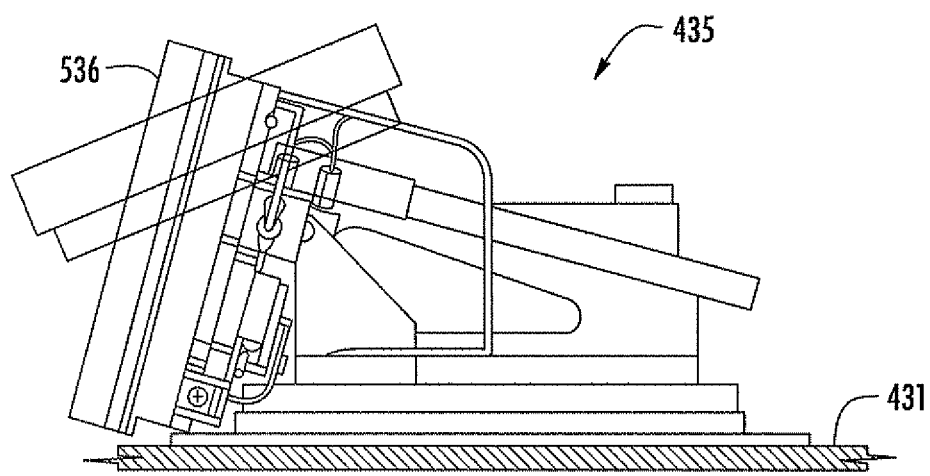
FIG. 15 is a side elevational view of the antenna mounted on the aircraft of the in-flight entertainment system as shown in FIG. 11.

Turning now additionally to FIGS. 14 and 15, advantages and features of the satellite antenna system 435 are now described in greater detail. The satellite antenna system 435 includes an antenna 536 which may be positioned or steered by one or more antenna positioners 538 as will be appreciated by those skilled in the art. In addition, one or more position encoders 541 may also be associated with the antenna 536 to steer the antenna to thereby track the DBS satellite or satellites 533. Of course, a positioning motor and associated encoder may be provided together within a common housing, as will also be appreciated by those skilled in the art. In accordance with one significant advantage, the antenna 536 may be steered using received signals in the relatively wide bandwidth of at least one DES transponder.

More particularly, the satellite antenna system 435 includes an antenna steering controller 542, which, in turn, comprises the illustrated full transponder bandwidth received signal detector 543. This detector 543 generates a received signal strength feedback signal based upon signals received from the full bandwidth of a DBS transponder rather than a single demodulated programming channel, for example. Of course, in other embodiments the same principles can be employed for other classes or types of satellites than the DBS satellites described herein by way of example, such as for receiving Internet data from an FSS satellite. In addition, the detector could operate on a portion of the transponder bandwidth but not the full transponder bandwidth.

In the illustrated embodiment, the detector 543 is coupled to the output of the illustrated intermediate frequency interface (IFI) 546 which converts the received signals to one or more intermediate frequencies for further processing by the MRMs 440 as described above and as will be readily appreciated by those skilled in the art. In other embodiments, signal processing circuitry, other than that in the IFI 546 may also be used to couple the received signal from one or more full satellite transponders to the received signal strength detector 543 as will also be appreciated by those skilled in the art.

A processor 545 is illustratively connected to the received signal strength detector 543 for controlling the antenna steering positioners 538 during aircraft flight and based upon the received signal strength feedback signal. Accordingly, tracking of the satellite or satellites 433 is enhanced and signal service reliability is also enhanced.

The antenna steering controller 542 may further comprise at least one inertial rate sensor 548 as shown in the illustrated embodiment, such as for roll, pitch or yaw as will be appreciated by those skilled in the art. The rate sensor 548 may be provided by one or more solid-state gyroscopes, for example. The processor 545 may calibrate the rate sensor 548 based upon the received signal strength feedback signal.

The illustrated satellite antenna system 435 also includes a global positioning system (GPS) antenna 551 to be carried by the aircraft fuselage 432. This may preferably be provided as part of an antenna assembly package to be mounted on the upper portion of the fuselage. The antenna assembly may also include a suitable radome, not shown, as will be appreciated by those skilled in the art. The antenna steering controller 542 also illustratively includes a GPS receiver 552 connected to the processor 545. The processor 545 may further calibrate the rate sensor 548 based upon signals from the GPS receiver as will be appreciated by those skilled in the art.

As will also be appreciated by those skilled in the art, the processor 545 may be a commercially available microprocessor operating under stored program control. Alternately, discrete logic and other signal processing circuits may be used for the processor 545. This is also the case for the other portions or circuit components described as a processor herein as will be appreciated by those skilled in the art. The advantageous feature of this aspect is that the full or substantially full bandwidth of the satellite transponder signal is processed for determining the received signal strength, and this provides greater reliability and accuracy for steering the antenna 536.

Another advantage of the antenna system 435 is that it may operate independently of the aircraft navigation system 553 which is schematically illustrated in the lower right hand portion of FIG. 14. In other words, the aircraft 431 may include an aircraft navigation system 553, and the antenna steering controller 542 may operate independently of this aircraft navigation system. Thus, the antenna steering may operate faster and without potential unwanted effects on the aircraft navigation system 553 as will be appreciated by those skilled in the art. In addition, the satellite antenna system 435 is also particularly advantageous for a single-aisle narrow-body aircraft 431 where cost effectiveness and low weight are especially important.

Figure 16:
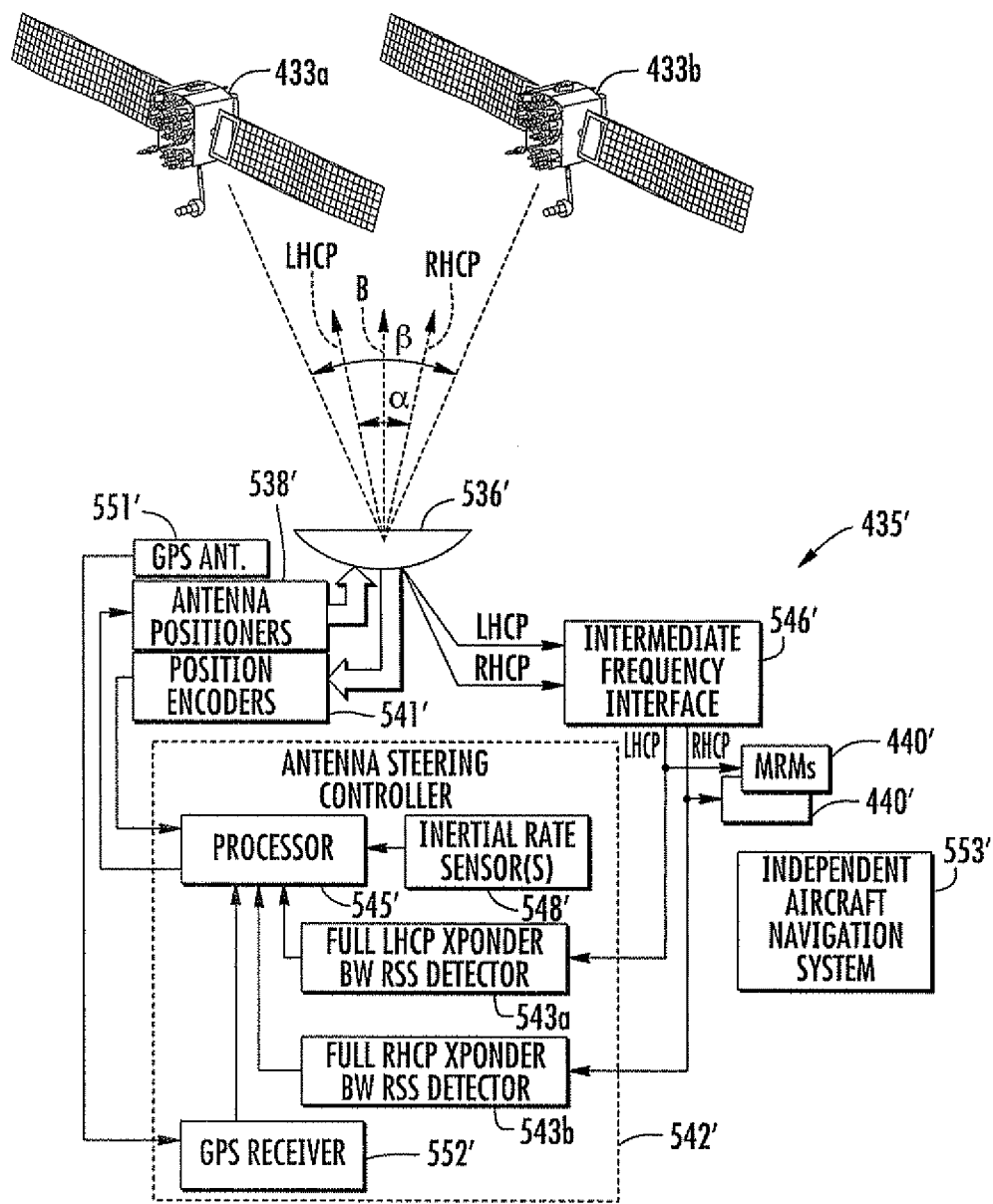
FIG. 16 is a more detailed schematic block diagram of a second embodiment of an antenna-related portion of the in-flight entertainment system as shown in FIG. 11.

Turning now additionally to FIG. 16, another embodiment of the satellite antenna system 435' is now described which includes yet further advantageous features. This embodiment is directed to functioning in conjunction with the three essentially collocated geostationary satellites for the DIRECTV® OBS service, although the satellite antenna system 35' is applicable in other situations as well. For example, the DIRECTV® satellites may be positioned above the earth at 101 degrees west longitude and spaced 0.5 degrees from each other. Of course, these DIRECTV® satellites may also be moved from these example locations, and more than three satellites may be so collocated. Considered in somewhat broader terms, these features are directed to two or more essentially collocated geostationary satellites. Different circular polarizations are implemented for reused frequencies as will be appreciated by those skilled in the art.

In this illustrated embodiment, the satellite antenna 536' is a multi-beam antenna having an antenna boresight (indicated by reference B), and also defining right-hand circularly polarized (RHCP) and left-hand circularly polarized (LHCP) beams (designated RHCP and LHCP in FIG. 16) which are offset from the antenna boresight. Moreover, the beams RHCP, LHCP are offset from one another by a beam offset angle $\alpha$ which is greatly exaggerated in the figure for clarity. This beam offset angle $\alpha$ is less than the angle $\beta$ defined by the spacing defined by the satellites 433a, 433b. The transponder or satellite spacing angle $\beta$ is about 0.5 degrees, and the beam offset angle $\alpha$ is preferably less than 0.5 degrees, and may be about 0.2 degrees, for example.

The beam offset angle provides a squinting effect and which allows the antenna 536' to be made longer and thinner than would otherwise be required, and the resulting shape is highly desirable for aircraft mounting as will be appreciated by those skilled in the art. The squinting also allows the antenna to be constructed to have additional signal margin when operating in rain, for example, as will also be appreciated by those skilled in the art.

The multi-beam antenna 536' may be readily constructed in a phased array form or in a mechanical form as will be appreciated by those skilled in the art without requiring further discussion herein. Aspects of similar antennas are disclosed in U.S. Pat. No. 4,604,624 to Amitay et al.; U.S. Pat. No. 5,617,108 to Silinsky et al.; and U.S. Pat. No. 4,413,263 also to Amitay et al.; the entire disclosures of which are incorporated herein by reference.

The processor 545' preferably steers the antenna 536' based upon received signals from at least one of the RHCP and LHCP beams which are processed via the IFI 546' and input into respective received signal strength detectors 543a, 543b of the antenna steering controller 542'. In one embodiment, the processor 545' steers the multi-beam antenna 536' based on a selected master one of the RHCP and LHCP beams and slaves the other beam therefrom.

In another embodiment, the processor 545' steers the multi-beam antenna 536' based on a predetermined contribution from each of the RHCP and LHCP beams. For example, the contribution may be the same for each beam. In other words, the steering or tracking may be such as to average the received signal strengths from each beam as will be appreciated by those skilled in the art. As will also be appreciated by those skilled in the art, other fractions or percentages can also be used. Of course, the advantage of receiving signals from two different satellites 433a, 433b is that more programming channels may then be made available to the passengers.

The antenna system 435' may also advantageously operate independent of the aircraft navigation system 553'. The other elements of FIG. 16 are indicated by prime notation and are similar to those described above with respect to FIG. 14. Accordingly, these similar elements need no further discussion.

Another aspect relates to the inclusion of adaptive polarization techniques which may be used to avoid interference from other satellites. In particular, low earth orbit satellites (LEOS) are planned which may periodically be in position to cause interference with the signal reception by the in-flight entertainment system 430. Adaptive polarization techniques would also be desirable should assigned orbital slots for satellites be moved closer together.

Accordingly, the processor 545' may preferably be configured to perform adaptive polarization techniques to avoid or reduce the impact of such potential interference. Other adaptive polarization techniques may also be used. Suitable adaptive polarization techniques are disclosed, for example, in U.S. Pat. No. 5,027,124 to Fitzsimmons et al; U.S. Pat. No. 5,649,318 to Lusignan; and U.S. Pat. No. 5,309,167 to Cluniat et al. The entire disclosures of each of these patents is incorporated herein by reference. Those of skill in the art will readily appreciate the implementation of such adaptive polarization techniques with the in-flight entertainment system 430 without further discussion.

A multi-beam phased array antenna 635 and control circuitry 640 associated therewith for simultaneously communicating with two different satellites 220, 230 will now be discussed in reference to FIGS. 17-22. Satellite 220 may be a direct broadcast satellite (DBS) for providing television programming (i.e., satellite TV) to the aircraft 120, and satellite 230 may be a fixed satellite service (FSS) for providing Internet data (i.e., satellite Internet) to the aircraft 120. The illustrated link 254 between the DBS satellite 220 and the aircraft 120 is receive only, whereas the illustrated link 252 between the FSS satellite 230 and the aircraft is transmit and receive.

Both of these satellites 220, 230 are geosynchronous earth orbit (GEO) satellites that are separated along an equatorial arc around the earth.

The satellites 220, 230 may be at the same orbital slot assignment or at two distinctly different slot assignments. The multibeam phased array antenna 635 and control circuitry 640 simultaneously generates dual antenna beams 650 and 660, with each antenna beam having a respective antenna beam boresight. Alternatively, the dual antenna beams 650 and 660 may be directed at the same satellite if the satellite is a combined DBS/FSS satellite.

A radome 637 protects the phased array antenna 635. In addition, the radome 637 is tuned to reduce RF signal degradation, specifically scattering loss and polarization degradation. The tuning is based on the operating frequencies of the phased array antenna 635 and the range of expected incidence angles, as will be readily appreciated by those skilled in the art.

A satellite transceiver 242 coupled to the phased array antenna 635 and to the control circuitry 640 is configured to simultaneously receive the television programming from the DBS satellite 220 and transmit/receive the Internet data to/from the FSS satellite 230. Although not illustrated, the satellite transceiver 242 includes a receiver for the television programming, and a receiver (e.g., a modem) for the Internet data. The receivers may correspond to the MRMs 440 illustrated in FIG. 14.

Intermediate frequency interfaces (IFI) 546 as also illustrated in FIG. 14 may be used to convert the received satellite signals to one or more intermediate frequencies for further processing by the MRMs 440. The IFIs 546 thus translate the received modulated signals in frequency and perform amplification. For the transmitter portion of the satellite transceiver 242, a transmitter provides the modulated signals to a block up converter (BUC) within the transmit signal path. The BUC performs an up-conversion and amplification of the modulated signals to be transmitted by the phased array antenna 235 and control circuitry 640.

The link 252 between the FSS satellite 230 and the aircraft 120 may be used as an uplink for requesting the Internet data directly from the ESS satellite. Alternatively, the request for the Internet data may be made over the air-to-ground interface 200 as discussed above with respect to the network selection controller 192, which is then relayed to the FSS satellite 230.

A server 162 is connected to the satellite transceiver 242. The server 162 includes a data memory cache 155 and a data traffic controller 158. An air-to-ground antenna 154 is coupled to the air-to-ground transceiver 152, which is also connected to the server 162. An optional control panel 164 is illustratively coupled to the server 162.

Figure 17:
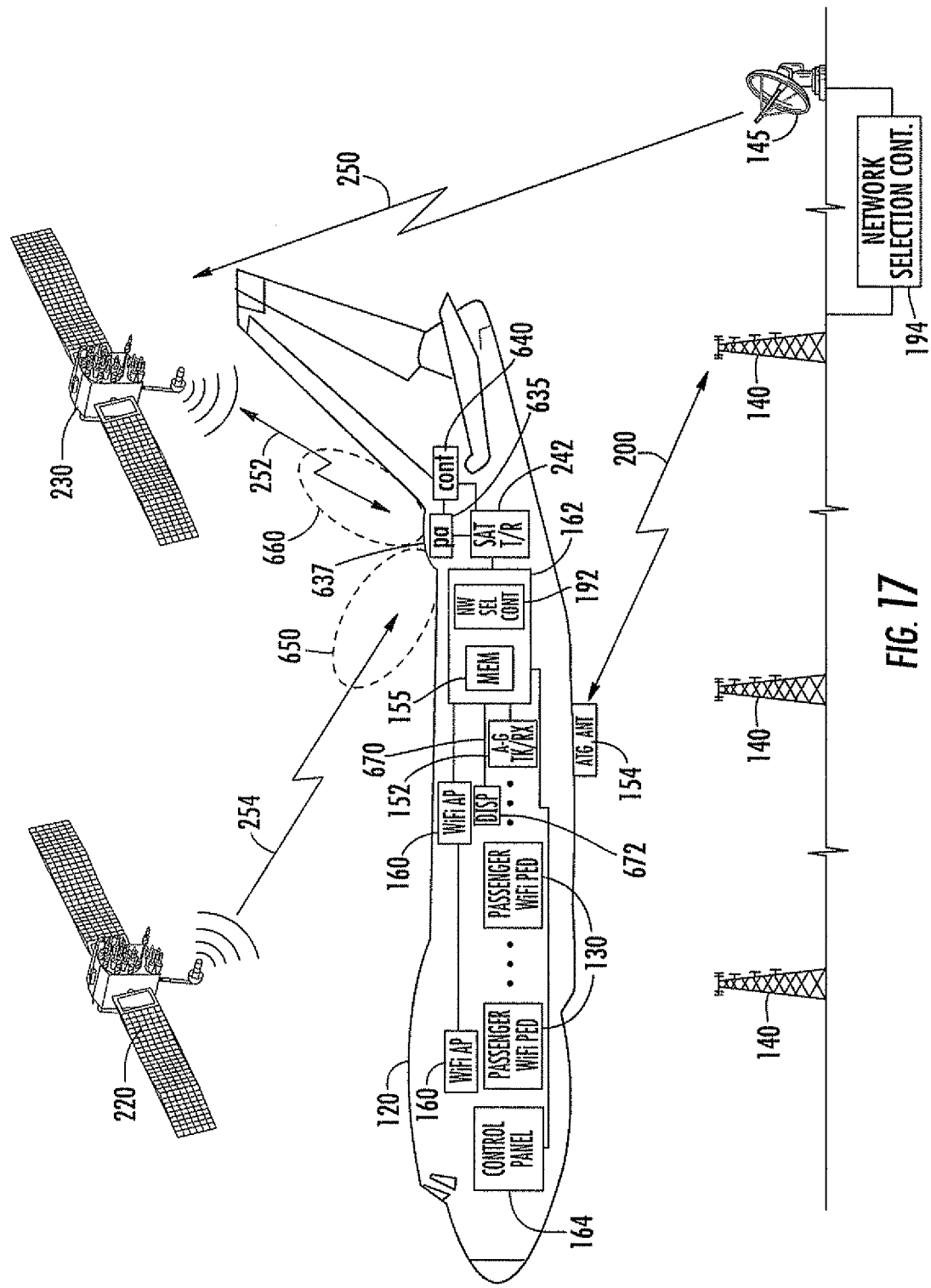
FIG. 17 is a schematic diagram of the overall components of an aircraft in-flight entertainment system including a multi-beam antenna for interfacing with two different satellites in accordance with the present invention.

A television programming distribution system is coupled to the phased array antenna 635 and control circuitry 640 via the server 162 to provide television programming within the aircraft 120. The television programming distribution system includes cabling 670 and at least one display 672 coupled thereto. Alternatively, the television programming distribution system may include SEBs 445 and VDUs 447 spaced throughout the cabin area of the aircraft 231 as illustrated in FIG. 17. Access points 160 are also coupled to the phased array antenna 635 and control circuitry 640 via the server 162 to provide a WLAN within the aircraft 120 for the Internet data.

Figure 18:
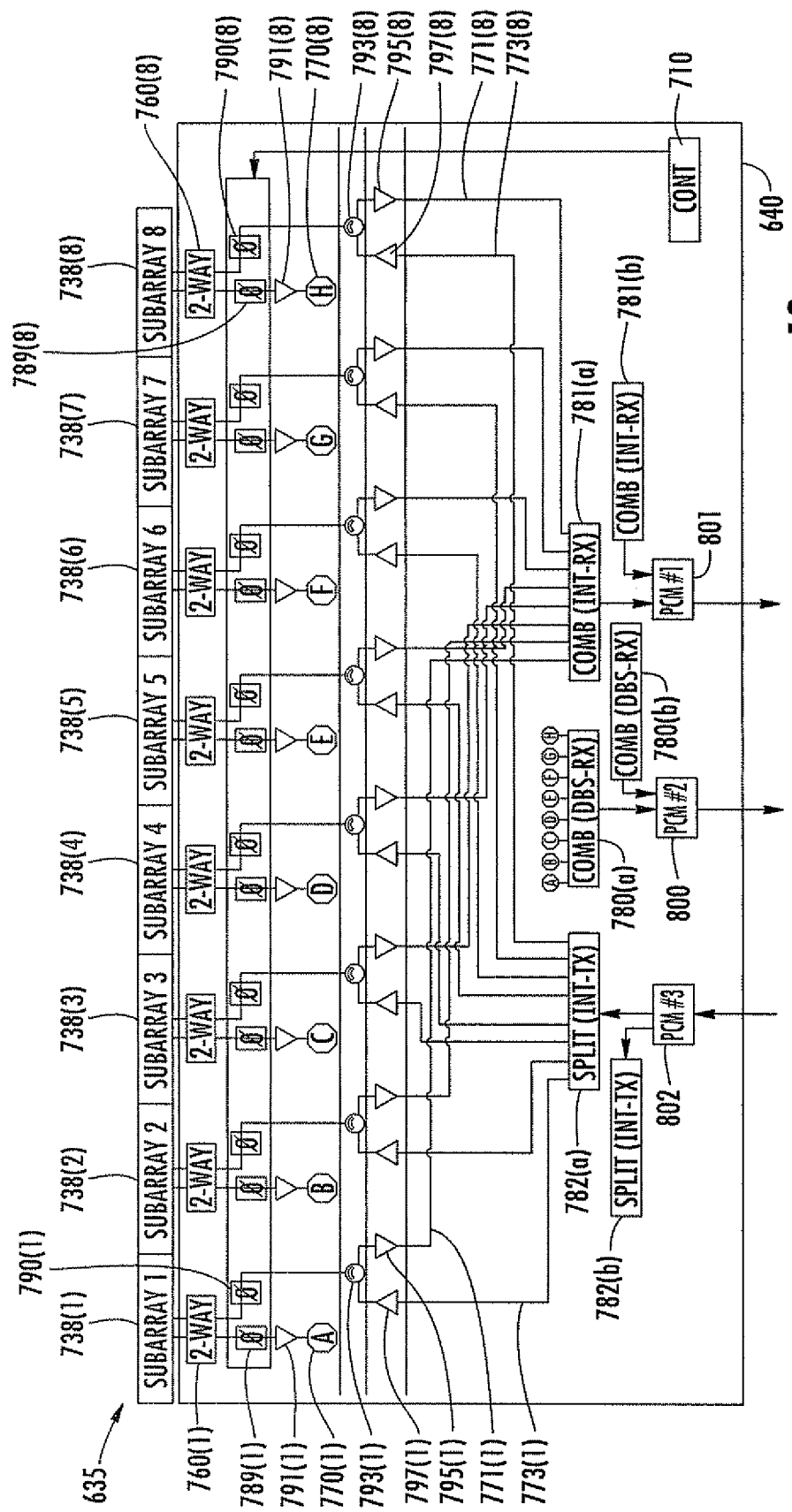
FIG. 18 is a more detailed schematic block diagram of one embodiment of an electrically steered multi-beam phased array antenna in accordance with the present invention.
Figure 19:
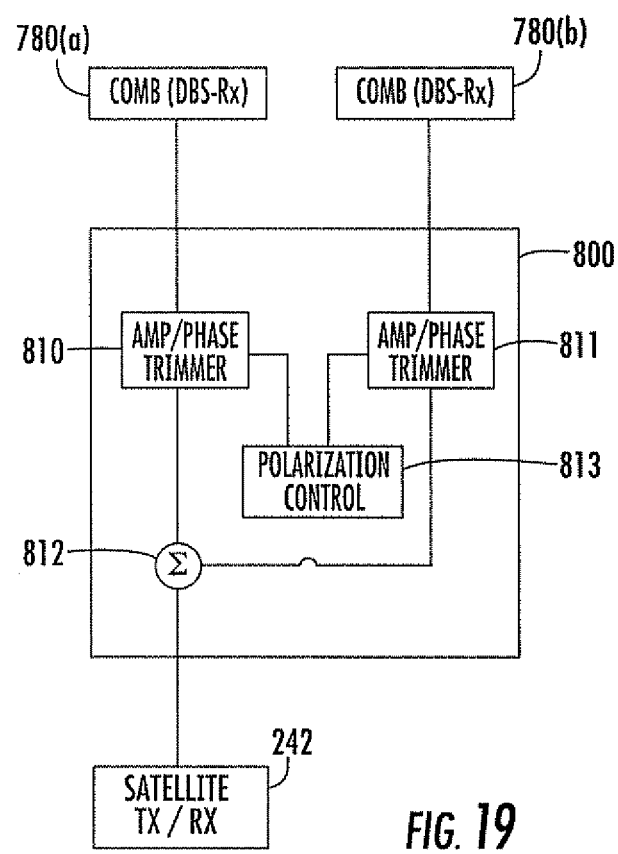
FIG. 19 is a schematic block diagram of the polarization correction module as shown in FIG. 18.

The phased array antenna 635 has been divided into 8 array segments or sub-arrays 738(1)-738(8), as illustrated in FIG. 18. The actual number of sub-arrays can vary as readily appreciated by those skilled in the art. The outputs of the sub-arrays 738(1)-738(8) are provided to corresponding signal splitters 760(1)-760(8) within the control circuitry 640. A respective sub-array and signal splitter will be generally referred to by references 738 and 760.

The television programming may be receive only from the DBS satellite 220, whereas the Internet data may be transmit and receive with respect to the FSS satellite 230. For the receive side of the phased array antenna 635 and control circuitry 640, each signal splitter 760 splits signals received by a corresponding sub-array 738 into first and second output signals. The first output signals are provided to a first set of phase shifters 789(1)-789(8), and the second output signals are provided to a second set of phase shifters 790(1)-790(8), as illustrated in FIG. 18.

The respective first and second phase shifters will be generally referred to by references 789 and 790. The first output signals correspond to received television programming from the DBS satellite 220 via antenna beam 650, and the second output signals correspond to received Internet data from the FSS satellite 230 via antenna beam 660. The second phase shifters 790 may also be used for forming the antenna beam 660 to transmit a request to the FSS satellite 230 for Internet data, as will be discussed in greater detail below.

Even though phase shifters 789, 790 are illustrated for directing the desired antenna beams 650 and 660, amplitude weights may be used in place of the phase shifters. Alternatively, a combination of phase shifters and amplitude weights may be used as will be readily appreciated by those skilled in the art. The term phase array antenna thus includes phase shifters and/or amplitude weights for directing the desired antenna beams 650 and 660. The term antenna beam shaping elements will be used to include phase shifters and/or amplitude weights.

A controller 710 is coupled to the phase shifters 789 and 790 to vary the phase shifts, and thus vary the direction of the antenna beams 650 and 660. If the control circuitry 640 included amplitude weights as noted above, then the controller 710 would control the amplitude weights accordingly.

The controller 710 may operate as discussed above for controller 142, 142' for tracking position of the satellites 220 and 230, as will be readily appreciated by those skilled in the art. In other embodiments, the tracking may be based on position of the aircraft versus the position of the satellites 220 and 230. The tracking may be an open loop pointing system based on GPS and/or inertial rate sensors, for example.

The first output signals from the first phase shifters 789 correspond to the television programming, which is receive only from the DBS satellite 220. The outputs of the phase shifters 789 are provided to low noise amplifiers 791(1)-791(8). The respective low noise amplifiers will be generally referred to by reference 791. The amplified signals from the low noise amplifiers 791 are collectively provided to a DBS combiner 780(*a*) via signal paths 770(1)-770(8). For purposes of simplifying the drawing, connections A-H at the outputs of the low noise amplifiers 791 respectively connect with connections A-H at the inputs of the DBS combiner 780(*a*).

Similarly, the second output signals from the second phase shifters 790 correspond to received Internet data. The received Internet data is provided to a set of circulators 793(1)-793(8). The respective circulators will be generally referred to by reference 793. The circulators 793 isolate transmit and receive Internet data from their intended transmit and receive signal paths, as will be readily appreciated by those skilled in the art.

On the receive side of the Internet data, the second output signals from the circulators 793 are provided to low noise amplifiers 795(1)-795(8). The respective low noise amplifiers will be generally referred to by reference 795. The amplified signals from the low noise amplifiers 795 are collectively provided to an Internet-receive combiner 781(*a*) via signal paths 771(1)-771(8).

On the transmit side of the phased array antenna 635 and control circuitry 640, an Internet-transmit splitter 782(*a*) provides the uplink request to high power amplifiers 797(1)-797(8) via signal paths 773(1)-773(8). The respective high power amplifiers will be generally referred to by reference 797, and the respective signal paths will be generally referred to by reference 773. The high power amplifiers 797 provide the amplified signals to the second phase shifters 790. The phase shifted signals to be transmitted are then directed back through the splatters 760 to the respective sub-arrays 738 via the circulators 793.

When the television programming is transmitted from the DBS satellite 220, two different orthogonal polarizations are used. To support receiving television programming in both polarizations, the phased array antenna 635 and control circuitry 640 provide more than one antenna polarization.

The phased array antenna 635 includes eight sub-arrays 738 for one polarization and another eight sub-arrays for an orthogonal polarization for a total of 16 sub-arrays. The sub-arrays for the orthogonal polarization are not illustrated to simplify FIG. 18. The illustrated sub-arrays 738 form antenna beam 650 for receiving television programming at one polarization. Although not illustrated, the other eight sub-arrays form another antenna beam for receiving television programming at an orthogonal polarization.

To support receiving television programming at the orthogonal polarization, another set of splitters and phase shifters are required in the control circuitry 640, which are also not illustrated. However, the control circuitry 640 illustrates a DBS combiner 780(*a*) for one polarization, and a DBS combiner 780(*b*) for the orthogonal polarization. In other words, the second set of sub-arrays, splitters and phase shifters supporting the orthogonal polarization would be coupled to DBS combiner 780(*b*).

Figure 20:
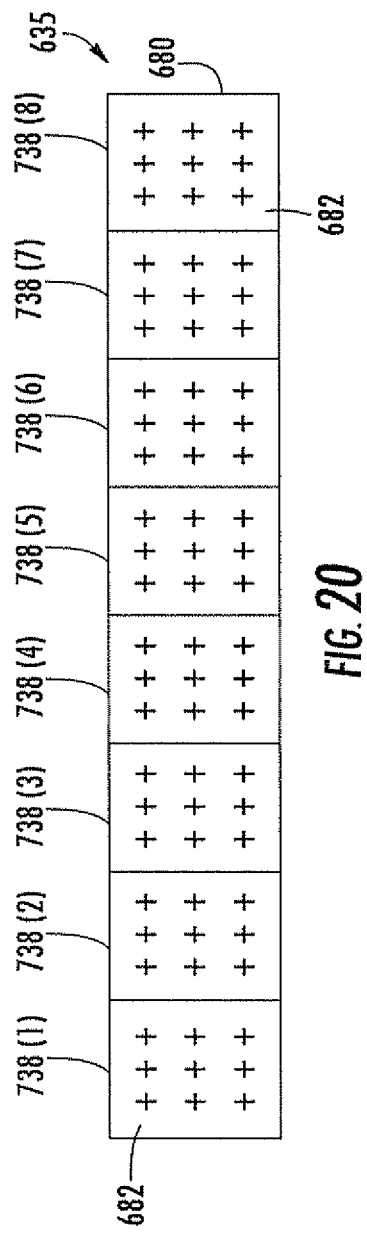
FIG. 20 is a block diagram of one embodiment of the phased array antenna in accordance with the present invention.

To correct the polarization based on the attitude of the aircraft 120, the combined television programming from one polarization output from DBS combiner 780(*a*) and the combined television programming from an orthogonal polarization output from DBS combiner 780(*b*) are provided to a polarization correction module 800. The polarization correction module 800 includes an amplitude/phase trimmer 810 coupled to the DBS combiner 780(*a*) and an amplitude/phase trimmer 811 coupled to the DBS combiner 780(*b*), as illustrated in FIG. 20. The outputs from both of the amplitude/phase trimmers 810, 811 are summed by a summer 812. A polarization controller 813 controls or adjusts the respective amplitude/phase trimmers 810, 811 based on the attitude of the aircraft 120. The attitude of the aircraft 120 may be provided by the independent aircraft navigation system 553, for example. The output of the summer 812 is provided to the satellite transceiver 242.

When the Internet data is transmitted from the FSS satellite 230, two different orthogonal polarizations are also used. One may be vertical polarization (VP) and the other may be horizontal polarization (HP), for example. The illustrated sub-arrays 738 form antenna beam 660 for receiving VP Internet data, for example. The other eight sub-arrays (not illustrated) form another antenna beam that is orthogonal to antenna beam 660 for receiving HP Internet data, for example.

To correct the polarization based on the attitude of the aircraft 120, the combined VP Internet data output from Internet combiner 781(*a*) and the combined HP Internet data output from Internet combiner 781(*b*) are provided to a polarization correction module 801. The polarization correction module 801 is similar to the polarization correction module 800 for the television programming.

A polarization correction module 802 is also used when transmitting from the phased array antenna 635 to the FSS satellite 230. One output of the polarization correction module 802 is provided as input to the Internet splitter 782(*a*), and the other output is provided as input to the Internet splitter 783(*b*). On the transmit side, the Internet splitters 782(*a*), 782(*b*) split the signal to be transmitted for requesting the Internet data, whereas on the receive side, the Internet combiners 781(*a*), 781(*b*) combined the received Internet data.

For the multi-beam phased array antenna 635 to receive television programming from the DBS satellite 220 and Internet data from the FSS satellite 230, the antenna beams for the composite satellite TV signal and the composite satellite Internet signal are thus different. The multi-beam phased array antenna 635 and the control circuitry 640 simultaneously generate the dual antenna beams 650 and 660, with each antenna beam having a respective antenna beam boresight. When orthogonal polarization is taken into account, four antenna beams may be simultaneously generated, with each antenna beam having a respective antenna beam boresight.

The antenna beam shaping elements introduce a phase and/or amplitude shift. The phase shift may be introduced by dedicated phase shifters 789, 790 for the signal paths 770, 771 and 773. The phase shifts may be fixed or adjustable. Alternatively, the phase shifts may be provided based on the delay introduced by the length of the signal paths 770, 771 and 773 so that the illustrated discrete phase shifters 789 and 790 may be representative of the phase shift created by the RF signal traces. Similarly, the amplitude shift may be introduced by dedicated amplitude weights for the signal paths 770, 771 and 773.

In one embodiment, the phased array antenna 635 includes a substrate 680 and a plurality of antenna elements 682 thereon, as illustrated in FIG. 20. The phased array antenna 635 is not limited to this particular embodiment. Other embodiments include waveguides or dipoles, for example.

Figure 21:
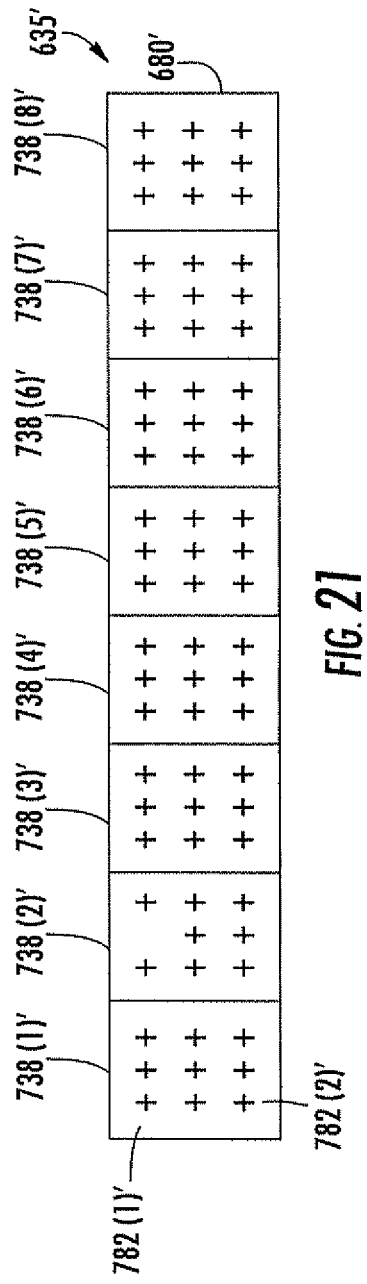
FIG. 21 is a block diagram of another embodiment of the phased array antenna in accordance with the present invention.
Figure 22:
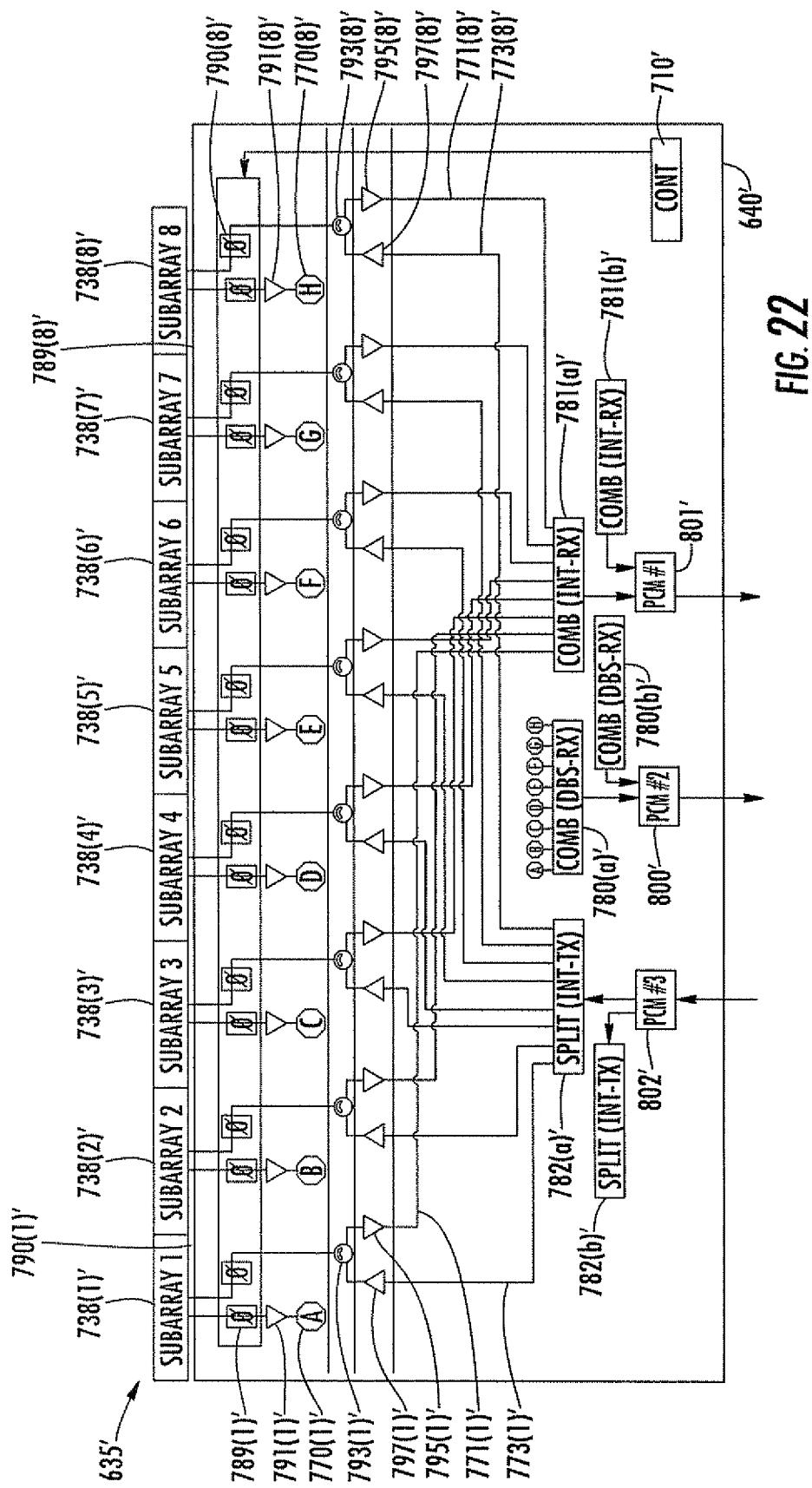
FIG. 22 is a more detailed schematic block diagram of another embodiment of an electrically steered multi-beam phased array antenna in accordance with the present invention.

In yet another embodiment of the phased array antenna 635', the antenna receives at two different frequencies as will now be discussed in reference to FIGS. 21 and 22. As a result, the splitters 760 are not required. In one embodiment, the antenna elements 782(1)' and 782(2)' are different sizes. A first plurality of antenna elements 782 (1)' is sized to operate at a first frequency, and a second plurality of antenna elements 782 (2)' is sized to operate at a second frequency different from the first frequency.

The first plurality of antenna elements 782(1)' support the Ku frequency band, whereas the second plurality of antenna elements 782 (2)' support the Ka frequency band, for example. The different sized antenna elements 782(1)', 782 (2)' may be interspersed with one another. As noted above, signal splitters are not needed. The remaining control circuitry 640' is the same.

The frequency of the satellite TV signals received by the multi-beam phased array antenna 635 is within a frequency range of 10.7-12.75 GHz or 20-30 GHz for the DBS satellite 220. The frequency range of the satellite Internet signals can be between 4-6 GHz, 11-14 GHz and 20-30 GHz for the FSS satellite 230. The illustrated phased array antenna 635 is configured to operate within the 10.7-18 GHz, which corresponds to the Ku band. The Ku band supports both reception of the satellite TV signals and the satellite Internet signals (when the satellite Internet signals are within the 11-14 GHz range).

Figure 24:
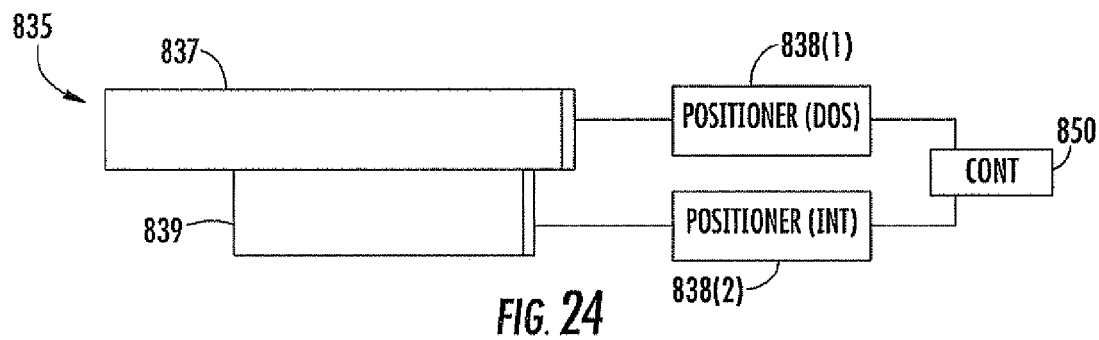
FIG. 24 is a block diagram of a side elevation view of the mechanically steered dual-beam antenna as shown in FIG. 23.
Figure 23:
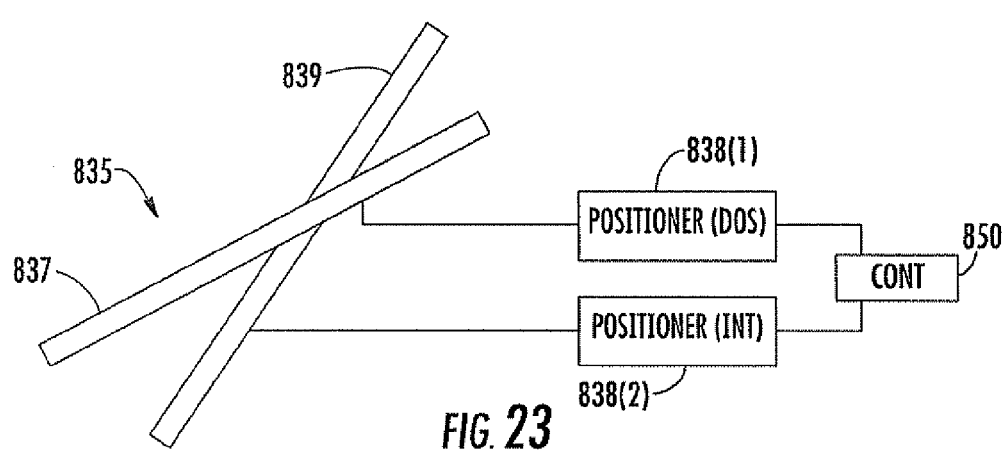
FIG. 23 is a block diagram of a top plan view one embodiment of a mechanically steered dual-beam antenna in accordance with the present invention.

As an alternative to electrically steering a phased array antenna, a mechanically steered antenna may be used. The mechanically steered antenna may be a phased array antenna as discussed above or may be a parabolic antenna, for example. Referring now to FIGS. 23 and 24, a dual-beam satellite antenna 835 includes a first aperture 837 for receiving the television programming, and a second aperture 839 adjacent the first aperture for receiving the Internet data.

A side view of the two apertures 837, 839 is provided in FIG. 23, and a top view of the two apertures is provided in FIG. 24. Although not shown, both of the apertures 837, 839 fit under the same radome 637. By having two separate apertures 837 and 839, the same or different frequencies can be supported and with different antenna beam pointing directions.

A first positioner 847 is coupled to the first aperture 837 to position toward the DBS satellite 220, for example. A second positioner 849 is coupled to the second aperture 839 to position toward the FSS satellite 230, for example. Each aperture 837, 839 thus has its own positioner 847, 849. A controller 850 is coupled to the positioners 847, 849 for control thereof. The controller 850 may operate as discussed above for controller 142, 142' for tracking position of the satellites 220, 230 as will be readily appreciated by those skilled in the art.

The controller 850 may operate as discussed above for controller 142, 142' for tracking position of the satellites 220 and 230, as will be readily appreciated by those skilled in the art. In other embodiments, the tracking may be based on position of the aircraft versus the position of the satellites 220 and 230. The tracking may be an open loop pointing system based on GPS and/or inertial rate sensors, for example.

Figure 25:
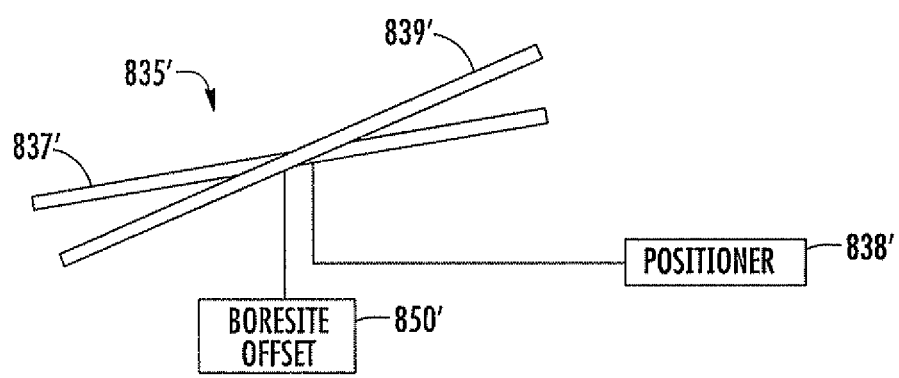
FIG. 25 is a block diagram of a top plan view of another embodiment of the mechanically steered dual-beam antenna as shown in FIG. 23.

As an alternative to each aperture 837', 839' having its own positioner, a common positioner 848' may be used, as illustrated in FIG. 25. The first and second apertures 837', 839' have a fixed or variable antenna beam offset (electrical or mechanical) between their respective antenna beams. In one embodiment, the common positioner 838' is used to position the first aperture 837' so the antenna boresight associated therewith is pointed toward the DBS satellite 220, and an offset controller 850' is used to adjust the boresight of the second aperture 839' associated therewith so that it is pointed at the FSS satellite 230.

The offset controller 850' may be configured to operate as a positioner. In other embodiments, the offset controller 850' may vary the antenna beam shaping elements (i.e., phase shifters and/or amplitude weights) when the apertures are configured as phased array antennas. Alternatively, the offset controller 850' may adjust the position of just one of the apertures with respect to the other aperture for obtaining the desired offset so that when common positioner 838' is operated, the antenna beam offset between the two apertures is maintained.

In yet another embodiment, the common positioner 838' points the respective antenna boresights associated with the first and second apertures 837', 839' so that both boresights are between the DBS and FSS satellites 220, 230. The offset controller 850' may then offset the antenna beams by half.

As with the phased array antennas 635 and 635', different orthogonal polarizations may be supported by the first and second apertures 837/839 and 837'/839'. Consequently, polarization correction would be required to compensate for the attitude of the aircraft 120, as discussed above for the polarization correction modules 800, 801 and 803.

As noted above, the satellite TV signals provided by the DBS satellite 220 are within a frequency range of 10.7-12.75 GHz or 20-30 GHz. Consequently, aperture 837, 837' supports the Ku or Ka bands, which includes this frequency range. The other aperture 839, 839' may be configured to support at least a portion of the frequency range within 10.7-30 GHz. This also corresponds to the Ku or Ka bands. Alternatively, both of the apertures 837/839 or 837'/839' may operate in the same frequency range, such as the Ku band or Ka band, or one could operate in the Ku band whereas as the other one operates in the Ka band.

For the aperture 839, 839' supporting the satellite Internet signals, the aperture may be used as an Internet forward channel. For the Internet reverse channel, a satellite channel may be used or an air-to-ground link from the aircraft 120 to the ground may be provided by an air-to-ground communications network 100, as discussed above. Such an air-to-ground communications network 100 may comprise at least one personal electronic device (PED) 130 to be operated on the aircraft 120. There is at least one access point 160 in the cabin of the aircraft 120 for providing a local area network for communicating with the PED. The air-to-ground transceiver 152 may be in the aircraft 120 and may be coupled to the at least one access point 160 for interfacing between the PED and the air-to-ground interface 200.

Spaced apart ground-based base stations 140 may be used for communicating with the aircraft air-to-ground transceiver 152 over the air-to-ground interface 200. The request for an Internet page (i.e., Internet reverse channel) by the PED 130 operating in the aircraft 120 is transmitted to the ground over the air-to-ground interface 200. The request provided by the PED 130 is often referred to as the return link. The information from the FSS satellite 230 to the aircraft 120 is often referred to as the forward link.

The air-to-ground interface 200 is a narrow band interface, which is acceptable for making the Internet return or reverse link traffic since this request is typically a narrower band than the forward link. In contrast, the satellite link 252 is a wide band interface, which is ideal for providing requested web pages that are typically wide band data.

As noted above, the air-to-ground interface 200 is used to communicate with the ground-based base stations 140. Each base station 140 interfaces with the public switched telephone network (PSTN) 141 and/or an Internet service provider (ISP) 142 through a switch 143 for providing data services that could include email and text messaging services. In this configuration, the web pages requested by a passenger would be performed using their PED 130 that communicates over the air-to-ground interface 200. The message on the ground would then be routed to an appropriate ground based transmitter 145 (separate from the ground based base stations) for transmitting the request to the FSS satellite 230. The FSS satellite 230 then transmits the web pages to the aircraft 120 over a satellite link 252 upon receiving the data from the ground.

Any of the above described embodiments for the antenna system can also be combined with a low gain switchable L-band antenna for L-band satellite connectivity service, with Iridium satellite communications being an example. The aircraft L-band antenna may be included in the same radome used for the satellite TV and Internet apertures as discussed above. For example, the L-band antenna may communicate via a satellite, or separate L-band antennas may be on the lower half of the aircraft for direct air-to-ground communications.

Many modifications and other embodiments of the invention will come to the mind of one skilled in the art having the benefit of the teachings presented in the foregoing descriptions and the associated drawings. In addition, other features relating to the aircraft communications system are disclosed in copending patent application filed concurrently herewith and assigned to the assignee of the present invention and is entitled AIRCRAFT IN-FLIGHT ENTERTAINMENT SYSTEM HAVING A MULTI-BEAM PHASED ARRAY ANTENNA AND ASSOCIATED METHODS, Ser. No. 12/252,296, the entire disclosure of which is incorporated herein in its entirety by reference. Therefore, it is understood that the invention is not to be limited to the specific embodiments disclosed, and that modifications and embodiments are intended to be included as readily appreciated by those skilled in the art.

That which is claimed:

1. An aircraft in-flight entertainment (IFE) system for an aircraft and comprising:
    a radome to be carried by the aircraft;
    a dual-beam satellite antenna and first and second positioners coupled thereto to be carried by the aircraft and protected by said radome, said dual-beam satellite antenna to simultaneously generate dual antenna beams for television programming and Internet data from respective spaced apart satellites and comprising
        a first aperture to be positioned by said first positioner and configured to operate within a frequency range of 10.7 to 18 GHz for receiving the television programming, and
        a second aperture to be positioned by said second positioner and adjacent said first aperture and configured to operate within a frequency range of 20 to 30 GHz for receiving the Internet data;
    a television programming distribution system to be carried by the aircraft and coupled to said dual-beam satellite antenna to provide television programming within the aircraft; and
    at least one access point to be carried by the aircraft and coupled to said dual-beam satellite antenna to provide a wireless local area network (WLAN) within the aircraft for the Internet data.

2. The IFE system according to claim 1 wherein said first aperture comprises a first phased array, and wherein said second aperture comprises a second phased array.

3. The IFE system according to claim 1 further comprising a controller coupled to said first and second positioners.

4. The IFE system according to claim 1 wherein each antenna beam has a respective antenna beam boresight.

5. The IFE system according to claim 1 wherein said dual-beam satellite antenna is configured to transmit to the satellite providing the Internet data.

6. The IFE system according to claim 1 wherein said first and second apertures each have different polarizations associated therewith; and further comprising at least one polarization correction module to adjust at least one of the polarizations based upon aircraft position.

7. The IFE system according to claim 1 wherein said first aperture provides orthogonal polarization toward one of the satellites and said second aperture provides orthogonal polarization toward the other satellite; and further comprising:
    a first polarization correction module associated with said first aperture for adjusting the corresponding polarizations based upon aircraft position; and
    a second polarization correction module associated with said second aperture for adjusting the corresponding polarizations based upon aircraft position.

8. The IFE system according to claim 1 wherein said television programming distribution system comprises cabling extending throughout the aircraft; and at least one video display coupled to said cabling for displaying the television programming.

9. The IFE system according to claim 1 wherein the at least one access point is to communicate with personal electronic devices (PEDs) within the aircraft.

10. The IFE system according to claim 1 wherein said at least one access point comprises a pico-cell.

11. The IFE system according to claim 1 wherein the WLAN comprises at least one of an 802.11 WLAN and an 802.16 WLAN.

12. An aircraft in-flight entertainment (IFE) system for an aircraft and comprising:
    a radome to be carried by the aircraft;
    a dual-beam satellite antenna to be carried by the aircraft and protected by said radome, said dual-beam satellite antenna to simultaneously generate an antenna beam for television programming and an antenna beam for Internet data from respective spaced apart satellites, with each antenna beam having a respective antenna beam boresight, said dual-beam satellite antenna comprising
        a first aperture for receiving the television programming,
        a second aperture adjacent said first aperture for receiving the Internet data; and
        said first and second apertures having an antenna beam offset between their respective antenna beams;
    at least one positioner to be carried by the aircraft and coupled to said dual-beam satellite antenna, with said at least one positioner comprising a common positioner for positioning both said first and second apertures at a same time while maintaining the antenna beam offset;

a controller coupled to said at least one positioner;

a television programming distribution system to be carried by the aircraft and coupled to said dual-beam satellite antenna to provide television programming within the aircraft; and at least one access point to be carried by the aircraft and coupled to said dual-beam satellite antenna to provide a wireless local area network (WLAN) within the aircraft for the Internet data.

13. The IFE system according to claim 12 wherein said first aperture comprises a first phased array; and wherein said second aperture comprises a second phased array.

14. The IFE system according to claim 12 further comprising an offset controller to be carried by the aircraft and coupled to said first and second apertures for adjusting the antenna beam offset.

15. The IFE system according to claim 12 wherein said dual-beam satellite antenna is configured to transmit to the satellite providing the Internet data.

16. The IFE system according to claim 12 wherein said first and second apertures each have different polarizations associated therewith; and further comprising at least one polarization correction module to adjust at least one of the polarizations based upon aircraft position.

17. The IFE system according to claim 12 wherein said first aperture provides orthogonal polarization toward one of the satellites and said second aperture provides orthogonal polarization toward the other satellite; and further comprising;

a first polarization correction module associated with said first aperture for adjusting the corresponding polarizations based upon aircraft position; and a second polarization correction module associated with said second aperture for adjusting the corresponding polarizations based upon aircraft position.

18. The IFE system according to claim 12 wherein said first aperture is configured to operate within a frequency range of 10.7 to 18 GHz, and said second aperture is configured to operate within a frequency range of 20 to 30 GHz.

19. The IFE system according to claim 12 wherein said television programming distribution system comprises cabling extending throughout the aircraft; and at least one video display coupled to said cabling for displaying the television programming; and wherein the at least one access point is to communicate with personal electronic devices (PEDs) within the aircraft.

20. The IFE system according to claim 12 wherein said at least one access point comprises a pico-cell.

21. The IFE system according to claim 12 wherein the WLAN comprises at least one of an 802.11 WLAN and an 802.16 WLAN.

22. A method for operating an aircraft in-flight entertainment (IFE) system for an aircraft and comprising a radome to be carried by the aircraft, a dual-beam satellite antenna to be protected by the radome, first and second positioners to be carried by the aircraft and coupled to the dual-band satellite antenna, a television programming distribution system to be carried by the aircraft and coupled to the dual-beam satellite antenna to provide television programming within the aircraft, and at least one access point to be carried by the aircraft and coupled to the dual-beam satellite antenna to provide a wireless local area network (WLAN) within the aircraft, the method comprising:

controlling the first and second positioners so that the dual-beam satellite antenna simultaneously generates dual antenna beams for television programming and Internet data from respective spaced apart satellites, the dual-beam satellite antenna comprising a first aperture to be positioned by the first positioner and configured to operate within a frequency range of 10.7 to 18 GHz for receiving the television programming, and a second aperture to be positioned by the second positioner and adjacent the first aperture and configured to operate within a frequency range of 20 to 30 GHz for receiving the Internet data;

providing the television programming to aircraft passengers via the television programming distribution system; and providing the Internet data to the aircraft passengers via the WLAN.

23. The method according to claim 22 wherein the first aperture comprises a first phased array, and wherein said second aperture comprises a second phased array.

24. The method according to claim 22 wherein the first and second apertures each have different polarizations associated therewith; and wherein the IFE system further comprises at least one polarization correction module to adjust at least one of the polarizations based upon aircraft position.

25. The method according to claim 22 wherein the first aperture provides orthogonal polarization toward one of the satellites and the second aperture provides orthogonal polarization toward the other satellite; the aircraft IFE system further comprising:

a first polarization correction module associated with the first aperture for adjusting the corresponding polarizations based upon aircraft position; and a second polarization correction module associated with the second aperture for adjusting the corresponding polarizations based upon aircraft position.

26. The method according to claim 22 wherein the television programming distribution system comprises cabling extending throughout the aircraft; and at least one video display coupled to the cabling for displaying the television programming; and at least one access point is to communicate with personal electronic devices (PEDs) within the aircraft.

27. The method according to claim 22 wherein the at least one access point comprises a pico-cell.

28. The method according to claim 22 wherein the WLAN comprises at least one of an 802.11 WLAN and an 802.16 WLAN.

* * * * *